(12) United States Patent
Gallagher et al.

(10) Patent No.: US 9,613,368 B2
(45) Date of Patent: Apr. 4, 2017

(54) SYSTEMS AND METHODS FOR PROVIDING AND DYNAMICALLY UPDATING CUSTOMER-SPECIFIC SHIPPING INFORMATION ON AN ON-SITE SERVER

(75) Inventors: Ralph J. Gallagher, Alpharetta, GA (US); Anthony G. Creasy, Suwanee, GA (US)

(73) Assignee: United Parcel Service of America, Inc., Altanta, GA (US)

( * ) Notice: Subject to any disclaimer, the term of this patent is extended or adjusted under 35 U.S.C. 154(b) by 883 days.

(21) Appl. No.: 11/833,468

(22) Filed: Aug. 3, 2007

(65) Prior Publication Data

US 2009/0037203 A1  Feb. 5, 2009

(51) Int. Cl.
*G06F 15/16* (2006.01)
*G06Q 30/06* (2012.01)
*G06Q 10/08* (2012.01)
*G06Q 10/10* (2012.01)

(52) U.S. Cl.
CPC ............ *G06Q 30/06* (2013.01); *G06Q 10/08* (2013.01); *G06Q 10/101* (2013.01)

(58) Field of Classification Search
CPC .................................................. G06F 15/16
USPC .................. 705/26, 1.1, 7.11; 235/375, 376; 709/217; 707/705, 821
See application file for complete search history.

(56) References Cited

U.S. PATENT DOCUMENTS

| | | | |
|---|---|---|---|
| 5,008,827 A | 4/1991 | Sansone et al. | |
| 5,910,896 A | 6/1999 | Hahn-Carlson | |
| 6,047,273 A | 4/2000 | Vaghi | |
| 6,219,653 B1 | 4/2001 | O'Neill et al. | |
| 6,405,183 B1 | 6/2002 | Bass et al. | |
| 6,684,400 B1 | 1/2004 | Goode et al. | |
| 6,690,929 B1 | 2/2004 | Yeh | |
| 6,757,689 B2 | 6/2004 | Battas et al. | |

(Continued)

OTHER PUBLICATIONS http://www.fedex.com/us/customersupport/express/faq/technical/shipmgrserver.html As reviewed on Jul. 27, 2007.

(Continued)

*Primary Examiner* — Akiba Allen
(74) *Attorney, Agent, or Firm* — Alston & Bird LLP

(57) ABSTRACT

A commerce system for serving a customer of delivery services using dynamically updated data including platform services, an operations-management server maintained by a vendor, and a local commerce server and a remote computer system maintained by a delivery services company. The operations-management server is positioned at a customer location and operatively connected to the platform services. The commerce server is operatively connected to the operations-management server and operatively connected to the platform services and includes local programs configured for providing services of the delivery services company to the customer. The remote computer system is connected to the local commerce server by a network. The remote computer system includes a message-management system, wherein at least one of the message-management compartments holds update data connected to the local commerce server for updating the commerce data, and includes remote programs. The operations-management and local commerce servers run interactively on the platform services.

33 Claims, 2 Drawing Sheets

(56) References Cited

U.S. PATENT DOCUMENTS

| | | | |
|---|---|---|---|
| 6,816,905 | B1 | 11/2004 | Sheets et al. |
| 6,915,268 | B2 | 7/2005 | Riggs et al. |
| 7,103,583 | B1 | 9/2006 | Baum et al. |
| 2002/0095308 | A1 | 7/2002 | Pragelas et al. |
| 2003/0163331 | A1 | 8/2003 | Podgurny et al. |
| 2003/0163332 | A1 | 8/2003 | Podgurny et al. |
| 2005/0171791 | A1 | 8/2005 | Chimenti et al. |
| 2006/0011716 | A1* | 1/2006 | Perkowski .................. 235/375 |
| 2007/0073552 | A1 | 3/2007 | Hileman |
| 2007/0078950 | A1* | 4/2007 | Hopkins ........... G06F 17/30861 709/217 |
| 2007/0204086 | A1* | 8/2007 | Jaroszewski et al. ........ 710/262 |
| 2008/0208676 | A1* | 8/2008 | Williams ............... G06Q 30/02 705/14.41 |
| 2010/0005396 | A1* | 1/2010 | Nason et al. ................. 715/746 |
| 2015/0067111 | A1* | 3/2015 | Vermeulen .......... G06F 9/45533 709/219 |

OTHER PUBLICATIONS http://www.dhl-usa.com/TechTools/detail/TTDetail.asp?nav=TechnologyTools/Shipping/PremiseSoln/EasyShipEnterprise As reviewed on Jul. 27, 2007.
http://www.ups.com/content/us/en/bussol/offering/technology/automated_shipping/worldship_html As reviewed on Jul. 27, 2007.
International Search Report and Written Opinion for International Application No. PCT/US/08/06725, dated Dec. 24, 2008.

* cited by examiner

SYSTEMS AND METHODS FOR PROVIDING AND DYNAMICALLY UPDATING CUSTOMER-SPECIFIC SHIPPING INFORMATION ON AN ON-SITE SERVER

BACKGROUND OF THE INVENTION

The present invention relates to systems and methods for providing and dynamically updating information available to a specific customer and, more precisely, to systems and methods for providing and dynamically updating information available to that customer by way of an on-site commerce server embedded within an on-site operations-management server, such as an enterprise resource planning server.

Package delivery services companies are continuously searching for new and better ways to serve their customers. A primary area of attention has been the interface through which customers access the services of the delivery company. With the advent of the Internet, delivery companies have increasingly provided access to their services on-line. Traditional on-line offerings have included ordering basic shipping (e.g., land or "ground" domestic delivery) and communication with customer service representatives.

Package delivery companies have also developed new services and the manner in which they offer their services in response to an increasing sophistication of their customers. Specifically, customers, such as large product companies, have improved their systems for managing product orders received from their customers and managing warehouse operations including inventory control. Hand-in-hand with these improvements, vendors of computer hardware and software have developed advanced operations-management solutions (e.g., servers). Operations-management solutions manage and/or assist in management of some, most, or all of the operations of an entity (i.e., the customer). Foremost of these solutions are enterprise resource planning systems (ERP's), which integrate some, most, or all of the data and processes of a company into a single computer system. ERP's include software and often hardware and usually link various system modules to a unified database.

In recent years, vendors of operations-management systems (including at least one server) and at least one package delivery services company have worked together to provide their common customers (e.g., products companies) convenient access to the services of the package delivery company by way of the operations-management system. For example, some vendors developed modules in their operations-management systems and allotted portions of their unified databases to providing services of the package delivery company. Accordingly, the respective customer can access the services of the package delivery company by way of the same interface of the operations-management system that they use for their other enterprise needs.

A shortcoming of arrangements in which the vendor maintains the module and database through which the customer accesses the services of the package delivery company is the laborious process the vendor must undertake to update data in the module and associated portion of their unified database. The burden of updating data can readily be quantified into terms of increased operation costs, which vendors sometimes pass onto their customers. Exemplary data includes data associated with products provided by package delivery companies, such as new services and new rates for new and existing services. Data updates are required regularly and/or intermittently and sometimes frequently. Updating the data is also challenging for the vendor because they are implementing data prepared by the package delivery company instead of the vendor generating and implementing their own data. Often, update data is generated by the delivery company using data extracts from their remote database (i.e., remote from the customer) and presented to the vendor in large amounts and/or in a somewhat unwieldy specification format. An exemplary data format is a spreadsheet on hardcopy or in an electronic version that is not easily transferable to the package delivery module.

Another shortcoming of arrangements in which the vendor develops and maintains the module through which the customer (e.g., products company) accesses the services of the package delivery company is a lack of uniformity and timeliness at which the new services and data are available. For example, regarding uniformity, a simultaneous release of the same update data from the delivery company to two different vendors for implementation into their respective operations-management systems often results in different times of implementation. Thus, one of the customers may not have access to the same new resources and/or information for many weeks or months. Sometimes, a vendor implements the same update data at widely varying times in the systems they maintain for various customers. One possible solution to this challenge has been to provide update data to vendors in stages or provide advance notices including some structure and substance of upcoming updates. However, under these scenarios, the vendor still has the burden of implementing all of the data at some time. Migrating all of the various customers to a new service or version of a service is very burdensome using traditional methods.

Another example of vendor subjectivity in the activity of implementing new data into the shipping module and unified database is when vendors position the activity lower within their prioritization of feature enhancements than the package delivery company would prefer. For example, although a vendor may be intent on timely implementing update data, they may however determine that their business needs are better served by demoting the activity within their prioritizations. Accordingly, the vendor may implement the data as soon as they decide is feasible or, for example, wait for the next data update from the delivery company so they can implement two consecutive updates at the same time or try only implementing the second of the two updates. In some cases, vendors fail to implement requested changes completely due either to neglect or in consideration of a costs-benefits analysis. Even if a vendor charges their customer for their work updating the system, they are still not relieved of the burden of implementing the updates and of course the customer does not appreciate the added charge.

Further, package delivery companies often set update standards by which vendors are asked to operate within. These requirements can include, for example, accuracy of the information updated in the vendor system compared to the information provided by the delivery company and time targets within which updates should be performed. Accordingly, vendors sometimes face the risk of falling out of compliance with the delivery company. Delivery companies would prefer avoiding reviewing vendor performance under such standards and vendors would prefer avoiding such review and the possibility of falling out of compliance.

An additional shortcoming of having the vendor develop and maintain the module through which the customer accesses the services of the delivery company, also relating to vendor subjectivity, is that sometimes vendors selectively implement data in a manner undesirably to the delivery company. For example, a vendor receiving updates including a new international shipping service and a new hazardous material shipping service for implementation into a module the vendor maintains for a company that makes and sells compact discs, may elect to implement only the international shipping service into the module. Unbeknownst to them, however, the company selling compact discs may indeed have hazardous waste shipping needs, such as regarding by-products of their manufacturing process. Thus, the compact disc company does not receive access to a service that may greatly improve their operations and the package delivery company likely looses revenue because the customer may not be aware of the new hazardous material service offering.

Another shortcoming of arrangements in which the vendor develops and maintains the module through which the customer accesses the services of the package delivery company is the additional work delivery companies usually undertake to verify that the data was implemented correctly. Thus, in addition to the package delivery company creating, bundling, and sending the data to the vendor and the vendor laboriously updating the shipping module in their system, the package delivery company also ensures proper installation and there may be considerable additional work for both parties in the event of an improper data update, whether due to vendor error or an error in the data provided to them.

Several solutions have been proposed to address the challenge of providing up-to-date services and data to shipping customers. One proposed solution is to provide some of the services and data to the customer by way of a remote server of the delivery company. This solution is similar to the traditional access that customers have to the services of the delivery services company through the Internet except that through this vendor-enabled solution the customers can access the on-line offerings via their existing operations-management system and some additional offerings ran from the vendor server. In this way, more wieldy (e.g., accompanied by a lot of data) and/or more frequently updated information (e.g., data associated with real-time tracking of a package during delivery) can be ran from a remote server of the package delivery company while services requiring less data and/or less frequent updates (e.g., data associated with rates for services) can remain on the vendor server. One shortcoming of this proposed solution is that vendors sometimes still maintain responsibility for updating a lot of data. This shortcoming is compounded with the fact that shipping service offerings are increasing rapidly in number and size (i.e., amount of data and business rules associated with the services) and are generally requiring more frequent changes.

Another shortcoming of the proposed solution described in the immediately preceding paragraph is that customers understandably often prefer not to depend heavily on the Internet for critical aspects of their operations—the shipping of products. For instance, a large products company, shipping over management 100,000 packages a day, for example, may suffer significantly from an Internet operation or connection problem, even if the problem lasts only for a short period of time during a day. Moreover, Internet latency is a problem. That is, even notwithstanding Internet operation or connection problems, inherent limitations on data transfer speed via the Internet often hinder operations in solutions such as that proposed in the immediately preceding paragraph more than users would prefer.

Additional shortcomings of the proposed solution relate to data privacy/security and corresponding levels of customer confidence. Data associated with the shipping operations of a customer may include sensitive information, which the customer and/or the delivery company would like to keep from unauthorized entities. Exemplary sensitive information includes rates at which a customer is being charged for the package delivery services, client information such as addresses to and from which packages are being sent, and descriptions of the contents of packages. Despite new technologies for protecting transmissions of data over the Internet, customer confidence in on-line data transmissions is kept down because a non-negligible level of insecurity remains.

BRIEF SUMMARY OF THE INVENTION

The present disclosure relates to a commerce system for serving a customer of delivery services of a delivery services company using dynamically updated data related to the delivery services. The system includes platform services positioned at a location of the customer and an operations-management server managed by a vendor positioned at the customer location and operatively connected to the platform services. The operations-management server includes a customer interface through which the customer accesses the operations-management server and an intra-system interface. The system further includes a local commerce server managed by the delivery services company positioned at the customer location, operatively connected to the operations-management server maintained by the vendor and the platform services. The local commerce server includes local programs configured for providing services of the delivery services company to the customer and a commerce-server interface for connecting the local commerce server to the intra-system interface of the operations-management server. The commerce system also includes a database operatively associated with the local commerce server for storing commerce data used by the local programs of the local commerce server to provide the services to the customer during operation of the commerce system. In addition, the commerce system includes a remote computer system maintained by the delivery services company positioned remote to the customer location and operatively connected to the local commerce server maintained by the delivery services company by way of an external network to allow transfer of data between the remote computer system and the local commerce server. The remote computer system includes a message-management system having a plurality of message compartments wherein at least one message-management compartment is configured to hold update data specific for the customer for updating the commerce data in the local commerce server. The remote computer system further includes remote programs including programs corresponding to each of the local programs. The operations-management server and the local commerce server run together and interactively on the platform services during operation of the commerce system.

In another aspect, the present disclosure relates to a commerce system for serving a plurality of customers using dynamically updated data. The system includes a plurality of local computer systems wherein each local computer system is positioned at a location of a respective customer and includes platform services and an operations-management server operatively connected to the platform services and including an intra-system interface. Each local computer system further includes a local commerce server operatively connected to the operations-management server and the platform services. The local commerce server of each local computer system includes local programs configured for providing services of a commerce entity to the customer using the commerce data and a commerce-server interface for connecting the local commerce server to the intra-system interface of the operations-management server. Each local computer system further includes a database operatively associated with the local commerce server storing commerce data for use in serving the client during operation of the commerce system. The operations-management server and the local commerce server of each local computer system run together and interactively on the platform services of the respective local computer system during operation of the local computer system. The commerce system further includes a remote computer system positioned remote to each local computer system of the plurality of local computer systems and operatively connected to the local commerce server of each local computer system to allow transfer of data between the remote computer system and each local commerce server. The remote computer system includes a message-management system including a plurality of message-management compartments configured to hold update data for updating the commerce data stored on the commerce servers of the plurality of local computer systems. The remote computer system further includes remote programs including programs corresponding to each of the local programs of the plurality of local computer systems.

In yet another aspect, the present disclosure relates to a method for dynamically updating data available to a customer at a location of the customer including providing platform services at the customer location and providing an operations-management server at the customer location operatively connected to the platform services. The method further includes providing a local commerce server at the customer location operatively connected to the operations-management server and the platform services wherein the local commerce server includes local programs and commerce data for use by the local programs to provide services of a commerce entity to the customer. The method also includes providing a remote computer system positioned remote to the customer location and operatively connected to the local commerce server by an external network to allow transfer of data between the remote computer system and the local commerce server. The remote computer system includes a message-management system having a plurality of message-management compartments and each message-management compartment is configured to hold data for updating the commerce data stored on the local commerce server. Moreover, the method includes updating the commerce data of the local commerce server by routing the update data from a particular message-management compartment of the plurality of message-management compartment to the local commerce server. Further, the method includes serving the customer including running the operations-management server and commerce server together and interactively on the platform services and using at least one of the local commerce programs and the commerce data updated by the update data received from the remote computer system in the updating step.

In still another aspect, the present disclosure relates to a method for dynamically updating data available to a plurality of customers at respective locations of the customers. The method includes providing a plurality of local computer systems wherein each local computer system is positioned at a location of a respective customer of the plurality of customers and includes platform services, an operations-management server operatively connected to the platform services, and a local commerce server operatively connected to the operations-management server and the platform services. The local commerce server includes local programs and commerce data for use by the local programs to provide services of a commerce entity to the customer. The method further includes providing a remote computer system positioned remote to the customer locations and operatively connected to the local commerce server of each local computer system by at least one external network to allow transfer of data between the remote computer system and the local commerce servers. The remote computer system includes a message-management system having a plurality of message-management compartments wherein each message-management compartment is configured to hold data for updating the commerce data stored on a corresponding commerce server of the commerce servers of the plurality of computer systems. The method also includes updating the commerce data of the local commerce servers by routing the update data from each message-management compartment to the corresponding local commerce server and serving each customer. Serving each customer includes, for each respective local computer system, running the operations-management server and the commerce server together and interactively on the platform services and using at least one of the local commerce programs and the commerce data updated by the update data received from the corresponding message-management compartment of the remote computer system in the updating step.

In a further aspect, the present disclosure relates to a process of installing a dynamically updating commerce system available to a customer at a location of the customer. The process includes installing a local computer system including providing platform services at the customer location and includes providing an operations-management server at the customer location including operatively connecting the operations-management server to the platform services. The process further includes connecting a local commerce server with the operations-management server at the customer location and to the platform services. The local commerce server includes local programs configured for providing services of a commerce entity to the customer and commerce data for use by the local programs to provide the services. The process also includes providing a remote computer system positioned remote to the customer location and operatively connected to the local commerce server to allow communication between the remote computer system and the local commerce server. The remote computer system includes a message-management system comprising a plurality of message-management compartments wherein each message-management compartments of the plurality of the message-management compartments is configured to hold data for updating the commerce data of the local commerce server. In addition, the process includes assigning at least one of the message-management compartments to being used in testing for proper installation of the local computer system, assigning access credentials for the local commerce server, and providing the access credentials to the local commerce server. Moreover, the process includes providing update data in the message-management compartments, receiving an inquiry for data from the local commerce server including receiving credentials supplied by the local commerce server, and verifying that the supplied credentials match the assigned access credentials. The process further includes updating the local commerce server by providing the update data from the message-management compartments to the local commerce server if the credentials match in the verifying step and ensuring that the local computer system operates as desired before and after the step of updating the local commerce server. Operation of the local computer system includes the operations-management sys-

DETAILED DESCRIPTION OF THE INVENTION

Figure 1:
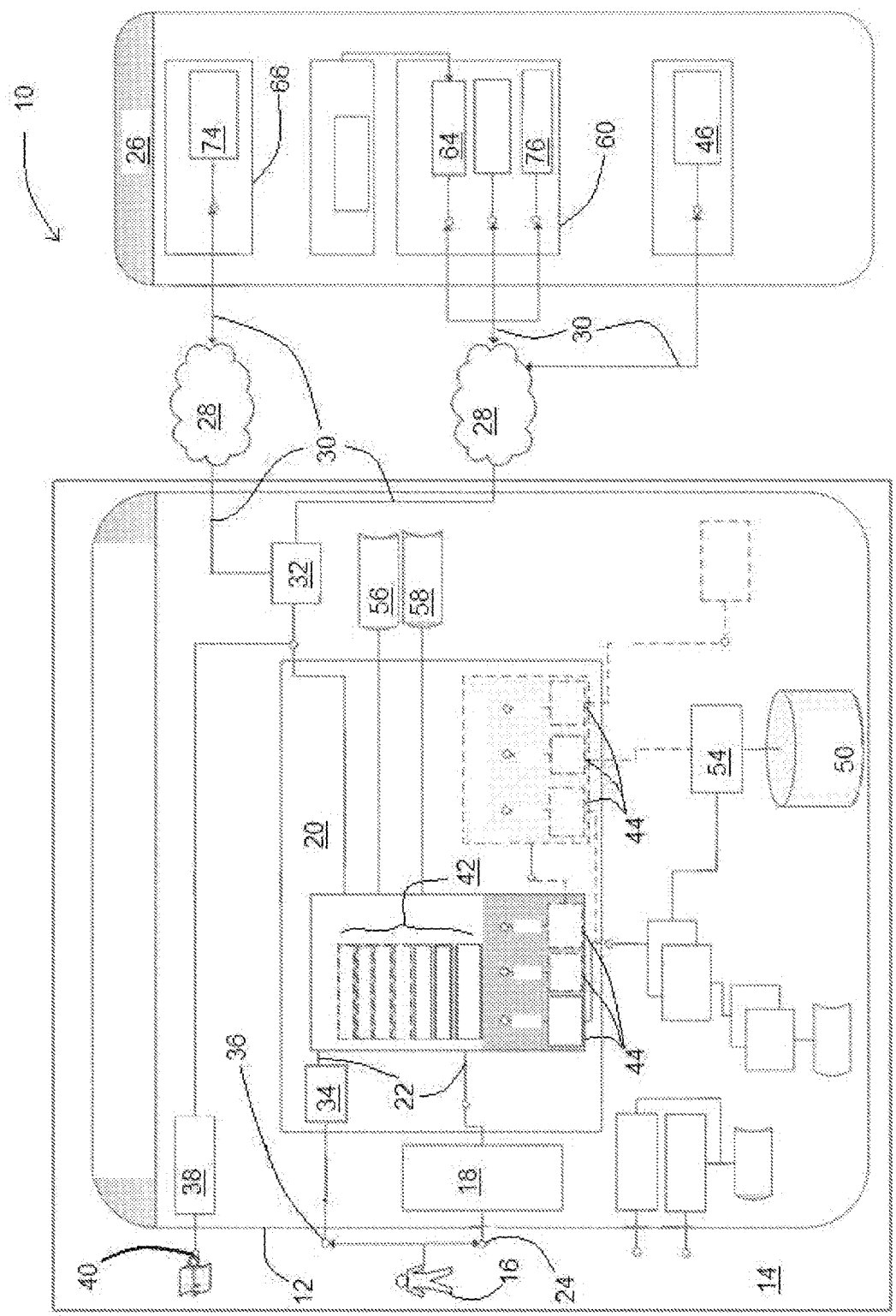
FIG. 1 is a diagram of a commerce system according to the present invention.

Referring to the figures, and more particularly to FIG. 1, a system for maintaining and dynamically updating a local commerce server according to the present invention is designated in its entirety by reference number 10. The commerce system 10 includes hardware 12 positioned at a location 14 of a customer and accessed by customer representatives 16. The hardware 12 holds a systems-management or operations-management software 18, such as an enterprise or vendor server that is supplied and maintained by a vendor of the customer. Maintenance includes, for example, management such as upkeep and updating. Regarding the operations-management software and other computer systems and components described herein, maintenance may include reconfiguring architecture, updating and removing data, adding and removing programs, data cleansing, updating security features, and other functions that are within the knowledge of one skilled in the art. When a computer system or component thereof (e.g., a server) is described herein as being maintained by an entity, that system or component may be maintained substantially exclusively by that entity or partially by that entity.

The vendor server 18 includes systems management software, which facilitates operations of the customer. For example, the vendor server 18 may include warehouse-management software for controlling operations within their warehouse including storage, retrieval, and distribution of products within the warehouse or a system of warehouses. The hardware 12 also holds a local or commerce server 20 operatively connected to the vendor server 18. The vendor server 18 may contact the commerce server 20 in response to requests received from the user 16 and/or in preparation (e.g., updating information within the vendor server) for serving the user.

As an exemplary connection between the commerce server 20 and the vendor server 18, the commerce server may be natively embedded with the vendor server. Although the commerce server 20 is sometimes described as being natively "embedded with" the vendor server 18, the connection between and relative positioning of the two servers 18, 20 may vary. For example, references to the commerce server 20 being natively embedded with the vendor server 18 may include embodiments of the present invention in which the commerce server 20 is natively embedded in, within, or into the vendor server 18, and in which the vendor server is natively embedded in, within, or into the commerce server.

In one embodiment of the present invention, native embedding includes providing, or coding, the software, or code, of the commerce server 20 within the software, or code, of the vendor server 18, or vice versa. In this way, the two servers 18, 20 are positioned in the same hardware and may directly communicate with each other without reaching through interfaces external to the servers 18, 20. Natively embedding the commerce server 20 with the vendor server 18 may also include connecting the servers 18, 20 to each other and to a common platform service, and running the servers together on that service. For example, the vendor server 18 and/or the commerce server 20 may include a platform service, such as the Java platform (e.g., Java EE or J2EE), available from Sun Microsystems of Santa Clara, Calif., and the servers 18, 20 may be connected directly to each other (e.g., one embedded within the other) on the platform service. Platform services are described in more detail below and generally identified by reference numeral 50.

As described below in more detail, the vendor server 18 may be maintained by a vendor, which may be any of many providers of software and/or hardware solutions to customers. Although the server 18 is described as a vendor server herein, the server 18 may represent operations or system-management software that is not fully or not at all maintained by the vendor. The server 18 may represent software that is partially or completely maintained by the customer. Thus, the server 18 may represent customer software with which the commerce server 20 is connected to, such as by being natively embedded with. The commerce server 20 includes commerce data associated with services offered by a commerce company, such as a package delivery company. Exemplary package delivery companies include United Parcel Services, Inc., (UPS), DHL, Federal Express, and United States Postal Service (USPS).

The vendor server 18 and commerce server 20 may include various types of interfaces for connecting to each other and otherwise, such as to the customer, as described below in further detail. Interfaces between the vendor and commerce servers 18, 20 may be referred to by various names. For example, an interface on the vendor server 18 for connecting to the commerce server 20 or other server may be referred to as a vendor interface, a vendor server interface, or an operations-management-system interface. That interface may also be referred to as an intra-system interface, as compared to an extra-system interface by which the vendor software connects to the customer representatives 14. As another example, the interface of the commerce server 20 by which the commerce server connects to the vendor server 18 may be referred to as the commerce-server interface.

In one embodiment, the commerce server 20 is connected to the vendor server 18 by way of their relative interfaces and a communication system 22 such as a web service. The communication system 22 may be configured using custom (e.g., non-standard) protocols or common (e.g., standard) protocols. A web service is a system designed to support interoperable server-to-server communication over a network including, for example, application program interfaces (API's), by way of web service connections. Each of the web service connections can be for example an API and the vendor server 18 can reach out to various devices such as to World Wide Web sites and the commerce server 20 through the web service. Exemplary application program interfaces include simple object access protocol (SOAP) or web service description language (WSDL), which is formatted based on an extensible markup language (XML).

The commerce server 20 provides up-to-date information to the customer by way of the vendor server 18. For example, the commerce server 20 may provide up-to-date rate quotes of the package delivery services company to the customer by way of the vendor server 18 in response to a contemplated package shipping scenario communicated to the vendor server by the customer (e.g., customer representative 16). As described below in further detail, the commerce server 20 may assist the customer in many other ways including by providing customer-specific discount offers, updated account-based rates, tracking data, time-in-transit data, and address validation data, and otherwise supporting logistics of the warehouse management program of the customer.

The vendor server 18 provides a user environment (not shown in detail) through which the customer uses the vendor server. The customer representative 16 accesses the user environment by way of a first user or customer interface 24 operatively connected to the vendor server 18. The first user interface 24 may include, for example, a personal computer (PC) having a screen displaying an often customized graphical user interface (GUI) through which the user 16 accesses the user environment. The vendor develops and maintains the user environment to allow the customer easy access to information helpful to the customer's operations including data related to package and mail delivery.

As described above, vendors may be any of many providers of software and/or hardware solutions to customers. The vendor community for package delivery companies generally includes PC vendors, host vendors, and other software vendors who participate in delivery programs of the delivery company, such as the "UPS Ready Program" of UPS. A common form of software supplied by vendors is enterprise resource planning (ERP) software. Some vendors supply customers with more than one of PC, hosting, and ERP solutions. For example, a single vendor may provide Internet hosting solutions to the customer as well as software for warehouse management. Examples of vendors are Pitney Bowes, Kewill Systems, Manhattan Associates, SAP, Oracle, and Microsoft. Vendors often configure, install, and maintain their server 18, which usually includes software tailored for a particular customer on an existing computer system of the customer.

The graphical user interface (not shown in detail) of the vendor software allows the customer (e.g., customer representative 16) to select between multiple action options. The options available to the customer may include an option to access the services or service-related data of the package delivery company (e.g., UPS) maintaining the commerce server 20. Thus for example, one screen of the graphical user interface may display a button or link referring to shipping or delivery services (e.g., "Package Delivery") or specifically referring to the company maintaining the commerce server 20 (e.g., a link labeled "UPS Delivery Services"). When the customer representative 16 selects this link, the software of the vendor server 18 may display a delivery system screen or shipping system screen on the graphical user interface specific to one delivery services company or a generic data-collection screen applicable to several delivery companies.

The shipping system screen may include, for example, up-to-date delivery-related commerce data, such as rating or pricing information or other data that may inform customer decisions, and include links to screens for ordering the various delivery-related services. For example, the graphical user interface may include drop-down menus related to variables determining the service the customer needs. For instance, the graphical user interface may include buttons representing options for the customer (e.g., customer representative 16) such as "Schedule Delivery", "Edit Delivery", "View Data For Delivery In Progress", and planning-related buttons such as "Planning" or "Get Rate Quote".

As described in the Background of the Invention section, above, heretofore, the process of updating shipping commerce data on the vendor server has included the delivery company preparing the data for sending and sending the data to the vendor, the vendor laboriously implementing the data into their server, and the two of them ensuring that the new data was implemented properly. Maintaining the commerce data associated with services and rates of the delivery company under the traditional method is costly and time intensive for vendors. According to the present invention, the delivery-related data including services, rate quotes, and special or discount offerings, is maintained on the commerce server 20 by the delivery services company, the source of the delivery-related data. Further according to the present invention, the commerce system 10 may also include one or more remote devices 26 such as a remote server operatively connected to the commerce server 20. The commerce server 20 may send information to and receive data from the remote device 26. As described below in further detail, these transfers may occur automatically or in response to a request initiated by the customer through the vendor server 18.

The remote device 26 can also be referred to as the back-end systems of the commerce system 10 and is the primary repository of data used in the commerce system. As described more below, data stored in the remote server, including service offerings and business rules, such as rates, associated with those offerings, is maintained in the remote device 26 and may be the basis for regular and selective updates of commerce data in the local commerce server 20.

The remote device 26 may hold data that designers of the commerce system 10 prefer to store remote from the commerce server 20 for various reasons. Designers of the commerce system 20 may include designers from a variety of entities. For example designers of the system 20 may include designers of a package delivery company (e.g., UPS) designing the local commerce server 20 and the remote devices 26 and designers of a vendor designing the vendor server 18. The preferred data may include voluminous data that the designer of the system 10 prefers not to store at the customer location 14 in order to, for example, take up less physical space at the customer location, limit on-site maintenance requirements, and limit the volume of data required to be transferred to the commerce server 20 during updating. The commerce server 20 can be configured to pull (i.e., receive) or push (i.e., send) data to and from the remote devices 26 of the commerce system 10 during select maintenance windows. For example, the commerce server 20 can be configured to pull and push very large amounts of data only between 2 a.m. and 3 a.m. each day. Transferring volumes of data at such off hours has many benefits, including lowering a likelihood that other processes of the customer will be disrupted and ensuring that the same data for the same services will be used throughout each day, which may not occur if changes are made during the day.

The remote device 26 may also provide access to other information that may be more easily generated or accessed by way of the remote device, such as real-time data regarding the in-transit (i.e., during delivery) location or condition of a package (e.g., disposition of sensitive items, such as items requiring transit within certain temperature conditions). The remote devices 26 of the commerce system 10 and their connection to the commerce server 20 will be described below in further detail.

The remote device 26 may be operatively connected to the commerce server 20 by way of an external computer network 28, such as the Internet, and an applications layer protocol 30 such as hypertext transfer protocol (HTTP). The commerce system 10 may include a communication manager 32 controlling interaction between the external computer network 28 and on-site (or "local") components of the commerce system 10 such as the commerce server 20. Specifically, the communication manager 32 manages the protocols of talking across the computer network 28. The communication manager 32 may be positioned within the commerce server 20 as shown in FIG. 1. The commerce system 10 may include multiple elements serving the functions of the communication manager 32. For example the commerce system 20 may include a local gateway element positioned at the item designated by reference number 32 and an external linking element (not shown), such as UPSlink of UPS, connecting to the gateway element.

The commerce system 10 may also include an administrative program 34 positioned within the commerce server 20, as shown in FIG. 1, or elsewhere within the on-site hardware 12. The vendor or delivery services company can access the administrative program 34 by way of a second user interface 36. The administrative program 34 may be configured to present an administration screen (not shown), such as via a GUI. The administration screen may be specific to the package delivery services company maintaining the data on the local commerce server. The administrative program 34 may be used by the vendor or the delivery services company to maintain the commerce server 20 or other on-site elements of the commerce system 10.

The commerce system 10 may also include an installation program 38 by which the delivery services company ensures that the commerce server 20 has been properly installed. The system 10 may also be configured so that these ensuring steps are performed by the delivery services company by way of the administrative program 36 or remotely via the Internet 28 and the communication manager 32. The installation program 38 may be positioned external to the customer location 14, such as in the remote device 26, in the commerce server 20, or elsewhere in the on-site hardware 12. When the installation program 38 is positioned in the commerce server 20, the vendor may access the installation program for installing the commerce server and verifying proper installation by way of the communication system 22 and either the first customer user interface 24 or another interface (not shown) the vendor may create. When the installation program 38 is positioned within the remote device 26, the vendor may access the installation program by way of the communication system 22 and the first user interface 24 or by way of the second user interface 36. As shown in FIG. 1, the vendor may also access the installation program 38 by way of a third user interface 40, which may be dedicated to use for or related to installation and verification of the commerce server 20. Uses related to installation and verification may include, for example, correcting an error in the vendor server 18 causing problems in the connection between the vendor server and the commerce server 20 and/or between the local computer system and the remote computer system wherein the error, such as verification problems, relates to protocols established in the system during the installation process. The installation and verification processes are described in further detail below.

The commerce server 20 may also be referred to as a local server (i.e., the local or on-the-customer-site server of the delivery services company), a local commerce server, a ComServer, or a shipping server. The commerce server 20 may include multiple commerce programs 42 and their supporting or core components 44. When the commerce server 20 is operatively connected to the vendor server 18 by a web service communication system 22, the commerce programs 42 of the commerce server 20 can be referred to as web service programs. The commerce programs 42 of the commerce server 20 may include programs already used by the delivery services company to serve customers by way of, for example, the Internet or, specifically, the World Wide Web.

The commerce programs 42 are programs by which the delivery services company provides its various services to the client. The programs 42 include variable data, such as current rating structures and rules, sometimes called business rules. Business rules are standards and requirements controlling operation and use of a service of a company, such as of a delivery services company (e.g., UPS). An example of a simple business rule is that a customer 14 cannot successfully schedule a domestic package shipment by entering a foreign destination address. Dynamic updating includes changing information in the local commerce server in an automatic, relatively fast, and accurate manner. The data dynamically updated may include, for example, data associated with the services offered by the delivery services company. For example, account-based rates, described below in further detail, and time-in-transit data may be updated dynamically.

The commerce programs 42 may be any existing or new service of the delivery services company. For example, exemplary commerce programs 42 include a rating web service, a shipping web service, a manifesting web service, a labeling web service, a local void web service, an end-of-day web service, a package level detail upload web service, an administrative/configuration web service, and information-based services such as a account-based billing web service, a reconciliation billing web service, a time-in-transit web service, a quantum view web service, and an electronic bill presentation and payment web service. It is contemplated that the commerce system 10 may include a capital web service as a commerce program 42. Part or all of each commerce program 42 may be positioned remote from the customer site 14 and may be moved between an on-site position and an off-site position as desired. For example, the time-in-transit web service may be positioned as a processing element 46 in the remote device 26 as shown in FIG. 1 and/or as one of the local embedded commerce programs 42. Descriptions of the exemplary web services listed in this paragraph are described in more detail in the following paragraphs.

Under one view, the services provided by package delivery services companies can be generally grouped into three areas: (1) manifest events whereby customers 16 request and ship packages; (2) invoice-related activities wherein customer actions are recorded and communicated to the client in various ways including bills; and (3) visibility needs of the customer, where the customer would like to know facts about deliveries while they are in route between origin and destination. Although what is being called information-based services can address services in all three of these areas, they focus on services relating to the latter two areas. As will be apparent in the many following descriptions, many of the programs of the commerce server 20 cannot be categorized squarely in only one of the aforementioned three areas. The rating web service is an example of a commerce program 42 that cannot be placed only in a single category. In one contemplated embodiment of the present invention, the capital web service mentioned above is a commerce program 42 that cannot be placed only in a single category.

The rating web service allows the customer to get rate quotes from the delivery services company without necessarily ordering a shipment. The rating web service is a very useful tool for customers 16 that wish to, for example, determine what shipping variables (e.g., weight, number of packages, pick-up date, and delivery date) may be most conducive to their schedule or budget or to shop amongst various shipping services companies for the best rate without having to actually place a delivery order. For example, the customer may first procure a rate for shipping one hundred boxes weighing a certain amount for arrival on a certain day and then wish to determine what the rate would be for shipping 200 boxes of the same weight for arrival on the same date.

The rating web service can also provide time-in-transit information. Time-in-transit information may be used in multiple ways. One way is for predicting an amount of time it will take to ship a package from one point to another. Such predictions may be helpful, for example, to a customer shopping for a preferred package delivery scenario considering variables such as cost and predicted time for delivery. Another way of using time-in-transit information is to provide the customer with real-time time-in-transit information regarding a package being shipped, such as providing an amount of time that has expired since the package left an origination point or an amount of time remaining before the package is expected to arrive at a destination.

Time-in-transit information may be especially helpful in time-sensitive scenarios considering that the delivery time of packages is not always simply determinable by distance nor is it necessarily reciprocal between points. Regarding distance, for example, a shipment between points A and B may take less time than a shipment between points A and C, though point A is closer to point C than to point B. As an example of the not-always-reciprocal nature of transit times, a shipment from point D to point E may take less time than a shipment from point E to point D. Such non-reciprocal transit times can reflect one or more of various factors including flight routes, airport traffic, and weather. Further information about the time-in-transit features of the commerce server 20 are provided below regarding the information-based services.

Further regarding the rating web service, the rating web service can be used by customer representatives 16 at various points in the stream or supply chain between the shelf where a product may be stored and a delivery vehicle (e.g., a delivery truck) for facilitating customer planning and decisions associated with their warehouse and/or inventory management systems. Although the rating web service is not generally configured to process an actual shipping order, though it may be so configured, the customer may be seamlessly transitioned to the completion of a delivery order at any time they find agreeable rates, such as by selecting a "Begin Order" or similarly named link shown on the display pages of the graphical user interface while the rating web service is being used.

The shipping web service is a manifest-related program. The shipping web service basically manages the fundamental operations of arranging a shipment. For example, the shipping web service includes data entry positions such as name of recipient, address of recipient, weight of package, and any special handling instructions, such as instructions for maintaining a package within sensitive-temperature requirements.

The manifesting web service, another manifest-related program of the commerce programs 42, is a program by which a customer can access a full list of items of the customer being delivered in a particular shipment, such as a shipment by sea. The list may be extracted from, for example, a bill of lading associated with the shipment.

The end-of-day web service is a billing-related program of the commerce programs 42 that operates at the end of a cycle, usually being a day. Through the end-of-day web service, the commerce system 10 is notified that the customer has completed facilitating their shipments by way of the commerce system for the day. The end-of-day web service may be triggered automatically, such as at the same time each day, or manually by a representative 16 of the customer. After the end-of-day web service is notified of such an end-of-the-day status, the commerce system 10 may prepare the bill(s) or invoice(s), which a customer representative 16 can view and print.

Regarding the package level detail upload web service of the commerce programs 42, a package level detail is an item such as a tag associated with a package being delivered. For example, the package level detail may be a shipping label displaying details about the package and its shipment, such as a tracking number, a consignor or sender, a consignee or receiver, a delivery address, contents of the package, nature of the contents, such as hazardous materials, and handling instructions for the package such as required temperature conditions. The package level detail upload web service is a program that compiles package level details generated throughout a cycle, such as a day, and submits it to the remote device 26 of the delivery services company for purposes such as record keeping. The package level detail upload process can be automatic, such as occurring at the same time every day or selectively performed in response to a request of the customer (e.g., customer representative 16). The package level detail upload web service may receive the end-of-the-day PLD information from the commerce server 20 by way of the external computer network 28.

The administrative/configuration web service is a program of the commerce programs 42 that stores pass-code information of the commerce server 20. As described below in further detail regarding the processes of configuring, verifying, authenticating, and commissioning the connection between the commerce server 20 and the vendor server 18, the pass-codes may include a developer key and an access key. The administrative/configuration web service may store an account number corresponding to the customer. The administrative/configuration web service may also store a developer key and an access key, which are associated with the account number corresponding to the customer. Some customers may have multiple account numbers associated with them (i.e., the customers), which numbers may be stored in the administrative/configuration web service. The administrative/configuration web service can also be used to change the configuration of the commerce server 20, such as by changing the keys or account numbers.

The commerce server 20 can also be configured or reconfigured through the administrative/configuration web service to perform certain operations such as retrieving certain desired information. For example, the commerce server 20 can be configured by way of the administrative/configuration web service to allow requests of tracking numbers and to procure and provide those numbers to the requester. Requests for information to the administrative/configuration web service can be tailored to sub-groups of information. For example, a request for tracking numbers can seek a particular range of tracking numbers by date of creation or particular aspects of the tracking number, such as a trailing three or four digits.

Searching tracking numbers can be especially helpful with respect to flexible tracking number schemes, such as those in which the customer may create their own tracking numbers within certain guidelines. For example, as long as a customer includes all or part of their assigned account number in a specified part of their tracking number (e.g., at the beginning of the tracking number), the customer can assign their own unique identifier thereafter. Customers appreciate this flexibility because they do not have to rely on the delivery services company to provide them with a tracking number every time they prepare to send a package but can rather create their own within the template and report the number to the delivery services company. The commerce system 10 can also be configured through the administrative/configuration web service to allow certain aspects of the operation of the commerce server 20 to be serviced outside of the commerce server.

It is contemplated that the information-based services of the commerce programs 42 may include the account-based billing web service, quantum view web service and the electronic bill presentation and payment web service. Although some or all of the other commerce programs 42 may be referred to as information-based programs, these particular programs have been grouped under this group name during development of the present invention.

The account-based pricing or account-based rating web service is a program associated with invoice-related activities. The account-based rating web service calculates pricing information for a customer based on their activity or performance during a certain preceding period. The account-based pricing web service may be configured according to terms agreed upon by the customer and the delivery services company. The account-based pricing web service may consider customer performance. For example, the account-based pricing service may be configured to provide higher discounts or other incentives to customers having higher recent activity, such as larger volume of packages sent though the delivery services company, or having preferred activity, such as sending packages though under-utilized delivery routes of the delivery services company. Recent activity may refer to purchase of services from the delivery services company during a particular recent period, such as within the last week or month. When a customer's activity drops during the considered preceding period, their rates for services may go up. The delivery services company may determine that considering and changing account-based rates in a certain increment, such as weekly, is most convenient because that increment coincides with an increment at which the company traditionally summarizes billing and performance for all customers in their system.

Implementing frequent rates for the customer using the account-based rating program has been very difficult using existing technologies for many reasons. From the perspective of the delivery services company, it has been challenging to amass the invoice information of all of the customers and determine rate adjustments for each account on a regular short-term basis (e.g., weekly). Even after rate adjustments are calculated, another challenge has been communicating the changes to the customer. That is, even when rates were updated in the system of the delivery services company, such as in the on-line systems of the delivery services company accessible via the company website, the customer often was not aware of the changes. When updated rates were sent to vendors maintaining enterprise resource planning software for the customer, it was difficult for them to implement the changes into their system quickly. Accordingly, the customer was unable to rely on regularly adjusted and accurate rate information. Thus, sometimes the customer would have been able to ship packages at a discounted rate, but did not because they did not know of that ability. In such scenarios, the customer and the delivery company may experience losses. For example, the customer may elect to ship through another delivery services company, thinking they are saving money but actually paying a higher rate than their newly discounted rate at the first delivery services company. Further, the first delivery services company misses an opportunity to ship packages for that customer and perhaps their visibility with that customer and acceptance by that customer is lowered.

The commerce server 20 according to the present invention, however, is configured to automatically and regularly update customer rates by way of the account-based rating web service and provide access to the updated rates to the customer (e.g., to the customer representative 16) by way of the user environment including the vendor server 18. As customers are better able to access up-to-date information regarding shipping, they are more likely to notice and act on the updated information (e.g., ship more at a published discounted rate).

There are additional benefits to housing and running the account-based rating service on the commerce server 20. For example, it is easier for the delivery services company to measure benefits, such as increases in revenue or cost savings, that the customer and the company are receiving by using the account-based rates. Also, housing the account-based rating service on the commerce server 20 protects data because the rate information is stored in a secure, controlled, and local place (i.e., the commerce server) for the customer to access, opposed to, for example, the customer having to access their account-based rates from an off-site server through the Internet. Also, by having the account-based rate information in one local place, the commerce server 20 and account-based rating web service can easily be configured to control access to the information, such as by allowing access only on an as-needed basis. Further, in addition to the substantive benefits of housing and running the account-based rating web service on the commerce server 20, a less tangible benefit is customer comfort accompanying knowing that private information regarding the rates they receive and details of their shipping practices (e.g., to whom they ship to) will be secure.

The reconciliation billing web service of the commerce programs 42 is another information-based service related to the second, billing, category of services. Under the old method of billing, invoices were generally simply generated and sent to the customer. The reconciliation billing program reconciles information regarding bills with other information such as shipping data. For example, instead of simply receiving a bill informing the customer that they owe a certain amount of money for fees for shipping a certain amount of packages during the previous week, the reconciliation billing web service can provide relationships between shipping activities and billing. For instance the reconciliation billing web service may cross-reference billing information with information regarding exceptions. Exceptions are events that may occur during delivery whereby a package is diverted from its planned route. For example, when a consignee or designated recipient of the package is unavailable during a delivery requiring in-person delivery, the non-delivery due to unavailable consignee is an exception. Also, if aspects of the delivery are afoul of requirements for that shipment, such as rules of the delivery company (e.g., weight of a package) or maintenance of special handling requirements (e.g., a package temperature becomes too low or too high), an exception event can be logged and the customer can be notified.

As described above, visibility-related services allow a customer to view progress of a package throughout its delivery process. Information that may be determined about the package includes the location of the package. These visibility-related services can be provided in a time-in-transit web service and/or in the rating web service described above. A visibility-related service having more functions than previous time-in-transit services is called quantum view. The quantum view web service provides more information to the customer than conventional time-in-transit services and may be built off of or added to an existing time-in-transit program instead of formed anew as its own program. Exemplary functions of the quantum view web service include special handling information and exception information. Special handling information relates to packages that require particular care in transport for one or more reasons. For example, some items, such as biological samples or hazardous materials must be kept within certain strict temperature ranges during transport.

The designer of the commerce system 10 may also couple quantum view to other existing and new programs of the delivery service company. References to the designer of the commerce system 10 may refer to multiple entities (i.e., designers) designing various parts of the system. One example of coupling products can be seen regarding products of UPS, such as UPS Returns and Reverse Logistics (maintained by UPS and/or vendors such as Manhattan Associates), which can be linked to quantum view. Generally, UPS Returns provides customers with a return shipping label that can be attached to an item they wish to return. Reverse Logistics is a service facilitating customer operations with respect to handling products returned by customers.

The commerce server 20, connected to the vendor server 18, such as by being natively embedded with the vendor server, provides a local foundation for many other existing and future services of delivery services companies. Additional programs that can be housed and ran in the commerce system 10 in general, and perhaps in the commerce server 20 in particular, include a labeling web service, a local void web service, and an account manager web service, and may include a utility web service. Particular product offerings of a particular delivery services company, UPS, include but are far from limited to the following: Worldwide Logistics; UPS Mail Innovations; and Supply Chain Services. These and many other programs that may be housed and ran in the commerce server 20 are described on the World Wide Web sites of the delivery services companies, such as www.ups.com.

Regarding implementation of the commerce system 10, the commerce programs 42 can be added to the commerce server 20 and implemented with the vendor server 18 in stages so the customer may access some of the commerce programs while others are being prepared. In determining the order with which to embed the various existing programs into the commerce server 20, the designer of a commerce system 10 for a particular customer may consider factors such as the services of the delivery services company that the customer uses or is expected to use and which of those the customer currently accesses through their enterprise resource planning software and which of those they access through the Internet. During an initial implementation of the commerce server 20, the vendor may provide the customer with access to the features first implemented into the commerce server by way of the commerce server and to the features not yet installed on the commerce server by way of existing channels.

Figure 2:
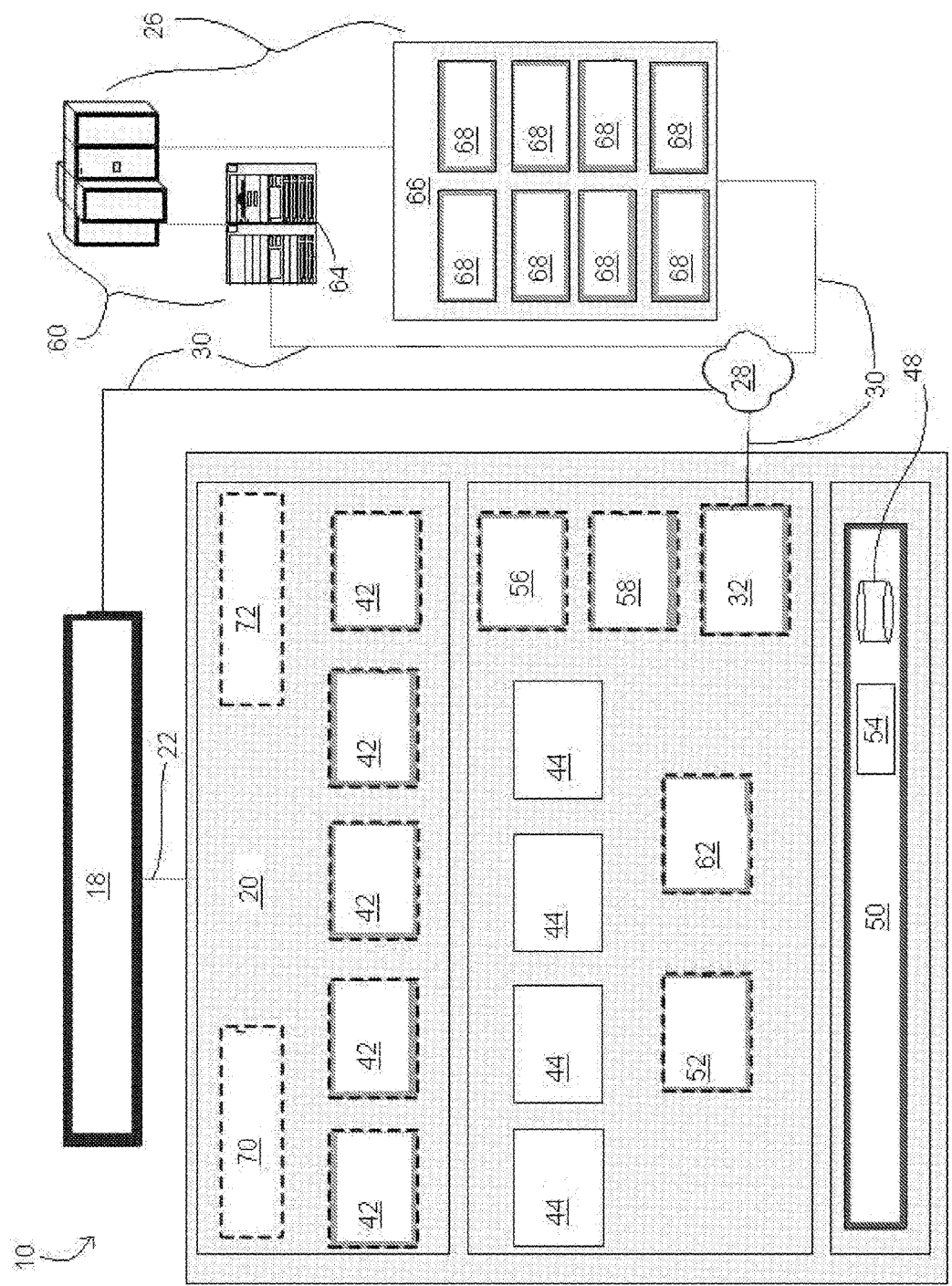
FIG. 2 is a conceptual view of the commerce system according to the present invention showing some of the same elements as FIG. 1 and some additional elements.

As described above and shown in FIGS. 1 and 2, the commerce server 20 also includes multiple core components 44 supporting operation of the commerce server and particularly supporting operation of the commerce programs 42. These core components 44, which may also be referred to as core internal processes, include a shipping component, a labeling component, a rating facility component, and an international forms component. Though the core components 44 are shown in FIG. 2 and described as being separate from the commerce programs 42, the core components 44 and the commerce programs may together form respective commerce programs. That is, the core components 44 may be considered part of the commerce programs 42.

Generally, the shipping component is the core component 44 of the commerce web server 20 supporting the shipping web server of the commerce programs 42. More specifically, the shipping web service calls the shipping component for information during operation of the commerce system 10 for various needed information. The shipping component may hold, for example, current rules associated with shipping. For instance, the shipping component may ensure that the shipping web server receives a recipient name and address and a selection of service type for a shipping request to be valid.

The labeling component of the core components 44 supports the labeling web service of the commerce programs 42. Particularly, the labeling web service calls the labeling component for generating and producing labels. The international forms component of the core components 42 is contacted by any of many web services when international shipping forms are needed. For example, the manifesting web service and the rating web service may request international forms or information associated with international forms from the international forms component.

Although the supporting core components 44 may be separate elements, they may also be combined and/or have overlapping functions or features. For example, although the shipping component formulates and stores rules, the shipping component may rely on another component to validate the information the commerce system 20 receives from the customer, such as by ensuring the received information is indeed received from a customer representative or that the information conforms to requirements associated with the other components, such as with respect to international forms regarding international deliveries.

The commerce server 20 also includes at least one database 48, preferably at the customer site 14, which stores various data including commerce data needed and used by the commerce system 10. Commerce data stored in the database 48 may include transaction data regarding the customer and may include all information needed to support operation of the commerce programs 42. The database 48 may be positioned in various locations within the hardware 12 of the customer site 14 without departing from the scope of the present invention. For example, data used by the commerce server 20 can be stored in a so-called unified database (not shown in detail) of the enterprise resource planning system 18 of the vendor, which may thus operate as the database 48 for the commerce server. The database 48 may be positioned outside of the commerce server 20 but within the on-site hardware 12 or within a platform or platform services 50 of the commerce server, as shown in FIG. 2. The platform services 50 of the commerce server 20 are described in more detail below.

The commerce server 20 also includes a data manager 52 operatively connected to the database 48. The data manager 52 manages the database 48 such as by controlling locations in which data is stored, protocols for keeping desired data and purging unwanted data, and how data is retrieved from the database. For example, the data manager 52 may arrange some or all data in the database 48 in tables.

Various types of databases 48 may be used with the commerce system 10 and the commerce server 20 without departing from the scope of the present invention. In one embodiment, the database 48 is based on structured query language (SQL). SQL is a common computer language used to create and update data in and retrieve and delete data from databases. The data manager 52 is configured to communicate with the database 48. An exemplary data manager 52 is the SQL Server or SQL Server Express (SQL Server is a registered trademark of Microsoft Corporation of Redmond, Wash.).

As described above and shown in FIG. 2, the database 48 may be positioned within the platform services 50 of the commerce server 20. Positioning the database 48 within the platform services 50 allows the database to be generally, substantially, or completely separate from the software associated with the commerce programs 42, each of which is preferable in at least one embodiment of various respective embodiments of the present invention. A primary controlling factor for positioning the database 48 is the ease by which the data manager 52 is connected to and able to communicate with the database. When there are multiple databases, the database manager 52 may include protocols instructing which database(s) it should talk to for certain processes, such as data retrieval regarding a particular type of operation of the commerce server 20.

As described above, the commerce server 20 is connected to the vendor server 18, such as by being natively embedded with the vendor server. As described above, native embedding may include providing, or coding, the software, or code, of the commerce server 20 within the software, or code, of the vendor server 18, or vice versa. Further, involving the platform services 50, native embedding of the commerce server 20 with the vendor server 18 may include operatively connecting the servers 18, 20 to each other, as described above, and to the platform services 50 and running the servers 18, 20 together on the same platform services 50. The servers 18, 20 may be said to be running interactively on the platform services 50 when they are both running on the platform services and interacting (e.g., exchanging data or otherwise communicating).

Many benefits result from operating the servers 18, 20 on the same platform services 50. For example, one benefit of interactively running the local servers 18, 20 on the same platform services 50 is high-speed data transfer between the local servers. The high-speed data transfer enabled by interactively running the local servers 18, 20 on the same local platform services 50 allows the commerce system 10 according to the present invention to run much faster than conventional systems. For example, conventional systems, wherein a local vendor server (e.g., an enterprise resource planning server) must reach beyond the local site 14 to external commerce servers to procure up-to-date data, generally run slower than commerce system 10 according to the present invention. One reason for this difference is the need of conventional systems to establish a connection through the applicable communication protocol (e.g., Hypertext Transfer Protocol (HTTP)), whereas the local servers 18, 20 of the commerce system 10 of the present invention only need reach to the platform services 50 for data.

Because of the latency problems and trouble transferring large amounts of data when needed of conventional systems, users (e.g., customers) are often inconvenienced and left desiring a better solution. As will be appreciated by those skilled in the art, other benefits resulting from operating the local servers 18, 20 on the same platform services 50 include increased ease of system maintenance and increased flexibility for connecting the servers 18, 20 to each other in various ways and for connecting the servers 18, 20, viewed as a combined unit, to other components of the commerce system 10.

As will be apparent to those skilled in the art, there are many types of platform services 50 that can be implemented with the commerce server 20 according to the present invention. The platform services 50 include an operating system 54 and software allowing the operating system to run applications associated with the software. Exemplary operating systems 54 include Windows XP Professional, 2000 Server, 2003 Server, and Vista, all provided by Microsoft Corporation.

The platform services 50 may also include the aforementioned data manager 52. An exemplary platform service 50 is the Java platform (e.g., Java EE or J2EE), mentioned above. The commerce server 20 may include any of a variety of application servers without departing from the scope of the present invention. For example, when a Java platform is used, an exemplary application server of choice is the JBoss application server, produced by Red Hat, Inc., of Raleigh, N.C. JBoss is an open source Java-based (more specifically, Java EE-based) server, which means that it has cross-platform capabilities enabling it to be used on any operating system 54 supporting Java. The Java platform can be created using any of various frameworks. One exemplary framework, used for developing Java platforms, is Struts available from the Apache Software Foundation (ASF), which is incorporated in Delaware. Apache Strut is an open-source framework. Other frameworks or products of ASF include Axis, Ant, and Log4J.

The commerce server 20 may include any of a variety of other computer systems. For example, the commerce server 20 may include an Application System/400 (also known as the iSeries or AS400), which is produced by International Business Machines (IBM) of Armonk, N.Y., other IBM computers, or a Macintosh computer, produced by Apple Inc. of Cupertino, Calif.

The commerce server 20 may also include a support services element 56 (shown in FIG. 2) having functions such as logging events and transactions. Event/transactional logging is helpful when, for example, errors or other noteworthy events have occurred within the commerce server 20, such as an error within the database 48. By logging the events and transactions, particular events, such as an error event, can be monitored and problems can be diagnosed and fixed. Repairs or other alterations to software code can be greatly facilitated by the ability of the support services element to identify events and positions within the code associated with that event.

The commerce server 20 further includes a configuration manager 58. The configuration manager 58 manages the core components 44 and, for example, their interaction with one or more external (i.e., remote to the customer site 14) databases of the delivery services company, such as databases associated with the remote devices 26. External databases may be positioned within an external computer or mainframe 60 or a network of computers or mainframes (shown in FIG. 2) positioned remote from the customer location 14. The external database files and stores data associated with operation of the commerce system 10, including, particularly, data that may preferably be stored off-site (i.e., away from the customer location 14). Data may preferably be stored off-site due to, for example, space requirements at the customer location, data security, and real-time activities, such as activities using satellite positioning systems, associated with the data and primarily—in some embodiments preferably—performed within the remote devices 26.

Among other specific functions of the configuration manager 58, the configuration manager controls the timing of communications between the commerce server 20 and the external mainframe 60. For example, the configuration manager 58 may be configured so the commerce server 20 contacts the external mainframe once per week to get new or changed rating information or new or changed zip code information. The configuration manager 58 may also be configured to seek updates according to an updating schedule of one of the commerce programs 42. For example, the configuration manager 58 may be programmed to initiate pulling of data from the remote devices 26 of the delivery services company monthly for the account-based rating web service to provide updated rate information with which the account-based rating web service operates. An interval at which the configuration manager 58 schedules pulling of data from the remote devices 26, such as from the external mainframe 60, may coincide with an updating schedule of the delivery company for changing the relevant data. For example, if account-based rates are updated in the remote devices 26 every four weeks, the configuration manager 58 may control the commerce server 20 to pull for new account-based rating data every four weeks, soon after the rates are updated in the remote devices.

As shown in FIG. 2, the commerce server 20 may also include an upload component 62. The upload component 62 formats data stored on the internal database 48 for uploading to the remote devices 26 (e.g., to the external mainframe 60 and any associated databases) of the delivery services company on a regular basis, such as at the end of each day. The upload component 62 works with the configuration manager 58 to coordinate information uploading (e.g., considering timing of the upload) to the external parts (i.e., parts remote to the customer site 14) of the commerce system 10. The vendor server 18 may communicate with and run the upload component 62 and configuration manager 58, as the vendor server may communicate with and run all internal processes of the commerce server 20.

The commerce server 20 may be built on the basis of existing systems by which the customer (e.g., customer representative 16) accesses the services of the delivery services company. For example, prior to the present invention, as described in the Background of the Invention section, customers could access pick-up and delivery services directly through their system and a web site of the delivery services company by way of the Internet or through enterprise resource planning software maintained by a vendor. Sometimes, the same customers accesses certain services of the delivery services company by way of the enterprise resource planning software maintained by the vendor and some services by way of the Internet. The commerce server 20 according to the present invention can be built off of many of the features of the existing systems. For example, select programs and components or all programs and components currently running on the web site or remote server of the delivery services company and select features or all of the features being offered through traditional enterprise resource planning software can be relocated to and ran from the commerce server 20.

As described above, the commerce system 10 includes remote devices 26 operatively connected to the on-site 14 elements of the commerce system and the remote devices 26 may include an external database and external computers 60. The remote devices 26 of the commerce system 10 may also include a message-management system 64, or mailbox system, within or operatively connected to the external computers 60. For example, the message-management system 64 may be positioned in a database or memory of the external computers 60. The message-management system 64 may also be referred to as a discrete messaging system or a customer-messaging system/customer-access-to-messaging system (CMS/CAMS). The message-management system includes one or more message-management compartments, or mailboxes, each for holding update data for use by one or more local commerce servers 20. When a transaction or service is communicated to/from the customer environment (i.e., elements of the commerce system 10 at the customer location 14), relevant data is sent back and forth through the external computer network 28 (e.g., the Internet) though the applications layer protocol 30 (e.g., hypertext transfer protocol (HTTP)).

During installation of the commerce server 20 in the customer environment, the message-management system 64 verifies that the developer key and access key of the vendor server 18 and commerce server 20 contacting the message-management system are accurate and that the account number associated with those keys match the location (i.e., the customer location 14) that the communication is coming from and/or the location information stored on the system of the delivery service regarding the particular customer. The developer key and access key will be described in further detail below regarding the installation and validation processes.

Data updates, such as changes to rate/price information, are put into a particular message-management compartment of the message-management system 64 associated with the corresponding customer account. When the commerce server 20 queries the message-management system 64 for updates, the request is transferred to an appropriate message-management compartment, or mailbox, of the message-management system to see if relevant updates exist using the account number and after at least the access key is authenticated. As described above, the configurations manager 58 controls the timing at which the commerce server 20 seeks and pulls information from the appropriate message-management compartment within the message-management system 64. If update data is found in the appropriate message-management compartment, the data is transferred to the commerce server 20 and installed in one or more of the internal database 48, the appropriate commerce program(s) 42, and the appropriate supporting core component(s) 44.

Rating and other service-related updates to the commerce server 20 may be made separately or together. In one embodiment of the present invention, the vendor server 18 will need to be separately reconfigured (e.g., by adding new relevant screens for the customer GUI) to accommodate new services uploaded to the commerce server 20. The updates to the commerce server 20 also include updates to the rules (e.g., business rules) associated with the respective updates, such as a new or changed program.

As shown in FIG. 2, the remote devices 26 of the commerce system 10 may further include a remote web device 66. The remote web device 66 includes multiple remote services or programs 68 available to the commerce server 20 by way of the external computer network 28 and perhaps specifically via the World Wide Web site of the delivery services company (e.g., www.ups.com). The remote services 66 are operatively connected to or positioned within the external computer 60. The commerce programs 42 on the commerce server 20 (or "internal commerce programs") and the remote commerce programs 68 of the remote web services 66 may coincide to various degrees. For example, all or some of the remote commerce programs 68 of the remote web services 66 may have counterpart internal commerce programs 42. Generally, every internal commerce program 42 has a counterpart remote commerce program 68. The remote commerce programs 68 may be leveraged or used to form the internal commerce programs 42 of the commerce server 20. In some instances, the remote web services 66 can be taken completely or almost directly from the remote device 26, bundled, and implemented into the commerce server 20. Leveraging existing elements in these ways and other ways may save time and cost of development of the commerce system 10 in general and the commerce server 20 in particular.

The remote web services 66 run activities on the web site of the delivery services company and support on-site 14 installations (e.g., various commerce servers 20) by providing supplementary data when needed. For example, remote web services 66 can provide real-time data (e.g., real-time tracking of a package during delivery) to the appropriate internal or local commerce program(s) 42. The remote web services 66 and may also be accessed by the commerce server 20 directly, such as via the external computer network. In one embodiment of the present invention, the commerce server 20 may be configured to selectively directly use the remote web services to serve the customer instead of using the local programs 44 under certain circumstances. An exemplary circumstance in which the commerce server 20 may directly use the remote web services 66 instead of using the local programs 44 is when the local programs are temporarily inoperable. The commerce server 20 may also use the remote web services 66 when those services include a program 68 that is not available as a local commerce program 44.

In order to efficiently use resources and facilitate transition to the new technology and methods represented by the present invention, the delivery services company may also leverage existing channels and tools for communicating with vendor installations (e.g., the vendor server 18) and/or the customer. For example, UPS has a set of discreet tools for requesting data from vendor servers 18 and the vendor servers can get certain data from the existing remote tools.

The designer of the commerce system 10 may determine that, in a few of the various embodiments of the system, some of the features (e.g., programs) of the commerce system should be local (i.e., positioned and ran from the customer site 14), some should be remote (i.e., positioned and ran from a position external to the customer site), or some should be local and remote. The designer may determine that although in a particular embodiment of the commerce system 10, a certain feature is preferably positioned locally, it is not feasible and/or reasonable to so position the feature. As an example, for features requiring updates including very large packets of data, it may not be logistically efficient to position that data remotely and regularly transfer such large volumes of data from the remote devices 26 to the respective commerce server 20. In such situations, the data may be stored locally (e.g., within the commerce server 20) and only the smaller updates or changes to that locally-stored data would be transferred from the remote devices 26 to the commerce server 20 to supplement or alter the data. Such relatively low-volume, updating-types of communication are sometimes referred to as discreet calls.

Regularly sending mass amounts of data could create many problems including bogging down the commerce system 10 and/or the client computer environment. Proper positioning of elements of the commerce system 10 can promote more timely data updates, quicker and smoother system operation, and less system errors. For example, although a transfer of data taking 100 to 200 milliseconds to complete may not be a long time in some situations, aggregating such slow transfer times when a customer is transferring a high volume of orders (e.g., around 100,000 orders) or requesting many pieces of data associated with a high volume of orders (e.g., a planning matrix information in the form of a time-in-transit matrix summarizing numerous relevant routes associated with certain numerous orders) can result in notable latency and in customers waiting a relatively long time to transfer or receive order information.

The remote web services 66 may also serve a backup function. If a portion of the local commerce programs 42 is unavailable for any reason (e.g., the commerce server 20 or components thereof temporarily lock up), the needed requests can pass through the commerce server to the remote web services 66 for servicing. In one embodiment, the commerce system 10 is configured so the customer does not notice a difference between the local commerce elements 42, 44 servicing a request or operation and the remote web services 66 servicing the request. In one embodiment, when the database manager 52 is having problems accessing required data from the database 48, the server 20 automatically routes the call to the remote web services 66.

Another function of the remote web services 66 is servicing service requests of a representative (e.g., a traveling salesperson) of the customer when they are away from their home location 14 and do not have access to the customer environment managed by the vendor. This aspect of the commerce system 10 is especially helpful when particular local data (i.e., data stored locally in a time-in-transit matrix) is specific only to operations involving the home customer location. For example, the commerce server 20 of a company location 14 in city C may hold an up-to-date matrix of time-in-transit data (described above) that only includes information pertaining to shipments to and from city C, or multiple select cities if the customer regularly ships to and from those cities. Although the entire time-in-transit matrix includes every to-from combination of cities around the world within the service areas of the delivery company, the designer of the system 10 may determine that it is more efficient to store only the local aspects of the matrix for a particular customer locally (i.e., on-site 14), such as when an overwhelming percentage of the customers time-in-transit requests relate to shipments to and/or from their home location. Thus, if a traveling sales representative of the customer is away from the home location 14 and needs time-in-transit information regarding a package sent from a location other than the customer site 14, he can contact the remote services 26 though an external computer (e.g., a wireless laptop connection) and the remote services can procure the needed information from the relevant remote commerce program(s) 66, databases, and/or message-management system 64 compartment and respond to the request.

As described above, the commerce system 10 according to the present invention may be developed using select computer-based features and tools of pre-existing delivery service systems. Such leveraging is described in further detail as follows. The commerce system 10 and commerce server 20 in particular may be built on aspects of an existing infrastructure such as infrastructure of an account-based rating service already operated by at least one delivery services company (i.e., UPS). For example, the existing form of account-based rating service includes a data distribution mechanism (known as DD/CAMS), which can be leveraged or extended for operation within the commerce system 10. Similarly, an access control mechanism (e.g., a mechanism known as Registration Services) can be leveraged or extended for operation within the commerce system 10. Also, as described above, other remote commerce programs existing before implementation of the present invention can be used to form the internal commerce programs 42 of the commerce server 20 according to the present invention. Leveraging existing elements in this way saves time and cost of development.

In one embodiment, the commerce system 10 is based on web-services. That is, the commerce programs 42 (and perhaps the remote commerce programs 68) are available to the vendor server 18 as web services. The web services-based architecture is also described above and can be referred to as a component-based or service-oriented architecture. Under this architecture, the commerce server 20 includes the set of core services 42 for all or most of the needs and scenarios of the customer. A different or variant of the component-based service-oriented architecture would be an architecture formed by providing more structure and development resources for configuring vendor-specific commerce servers, which are developed on a per-server basis for operation only with a particular vendor server 18. Although such a vendor-specific architectural strategy is within the scope of the present invention, a more component-based service-oriented architecture is preferred in at least one embodiment of the present invention.

One type of web services-based architecture is a request-processing architecture available from Apache Software Foundation (ASF). The request processing architecture is so named because of the request/response protocol of the communications between the system elements and the web services 42. Generic request processing of services-oriented architecture includes more open interfaces compared to interfaces associated with other delivery service-providing systems. By using a more standard/generic architecture, more tools, such as application program interfaces (APIs) are available for configuration and use with the commerce system 10, coding is generally easier, and work and cost of development and maintenance are generally lowered. It is contemplated that due to the more generic, open interfaces of the request processing architecture, the commerce system 10 and commerce server 20 in particular will be preferred by customers over systems using other architectures.

As will be described below in further detail and shown in FIG. 2, vendor-specific features or functions can be implemented by isolating vendor-specific features through a vendor-specific adapter 70. An adapter is a communication channel or interface between elements such as the commerce server 20 and the vendor server 18. Creating custom adapters allows primary features (e.g., commerce programs and components 42, 44) of the commerce server 20 to remain the same for most or every one of the commerce servers notwithstanding varying deployment environments (e.g., deployment with different vendor servers 18 and customer environments).

All vendor-shipper adapters within the commerce system 10, including one or more additional adapters 72, which may be general and not vendor-specific, are positioned and mapped between the commerce server 20 and the vendor server 18. Adapters 70, 72 may be internal and/or external to the commerce server 20. In one embodiment of the present invention, the vendor is responsible for creating the adapter(s) on their side (e.g., within the vendor server 18) that talks to the adapter on the side of the commerce server 20 (e.g., within the commerce server). The commerce system 10 may also include adapters for connecting to remote services.

The adapters 70, 72 installed in the commerce server 20 may correspond to the interface of a particular vendor of a common vendor interface. For example, the commerce server 20 may include adapters 70, 72 configured for operative connection to the interface(s) of an SAP vendor server, which are X-carrier adapters using the X-connect protocol. Some suppliers of enterprise planning resources, such as SAP, may not currently have shipping functionality programmed in their software but have the platforms that allow such functionality, such as through the commerce server 20.

As will be appreciated by those skilled in the art, the designer of the commerce system 10 may consider how the interfaces 70, 72 of the commerce server 20 are versioned. The designer of the commerce system 10 may also consider interface issues such as mapping and other dependency-type variables related to connecting to particular vendor interfaces.

Another strategy and architecture for implementing vendor-specific features or functions into a commerce system 10 is to utilize a feature activation mechanism (not shown in detail). The feature activation mechanism may be designed to configure individual features of the commerce server 20 during installation on a per-deployment basis. Accordingly, the commerce server 20 can include seeds for configuring each available feature (e.g., commerce programs 42) and programming of the vendor-specific feature activation mechanism determines which of these seeds is installed and implemented during configuration or update of the commerce server 20 in connection with the corresponding vendor server 18 for the particular deployment.

In one embodiment of the present invention, all components should be coded in Unicode, which is a computer-industry communication standard designed to allow text and symbols from all of the writing systems of the world to be consistently represented and manipulated by computers. Unicode has been used in many recent technologies, such as XML, the Java programming language and modern operating systems 54. In another embodiment, in which the commerce system 10 includes pre-existing non-Unicode elements, all or as many as practical of the new components of the commerce system should be created in Unicode. The designer of the system 10 can evaluate whether existing components of the system should be changed to Unicode based on variables including system interoperability, cost of updating, and expected system performance needs. In one embodiment of the present invention, at least the database 48 and interfaces thereto allow Unicode.

Regarding leveraging interfaces (i.e., using pre-existing interfaces), pre-existing tools for communicating in the corresponding markup language, such as the extensible markup language (XML), may be used in the architecture of the commerce system 10 according to the present invention. For example, UPS has an XML-related interface called XML On-Line Tools (XOLT), which underlies current shipping programs for UPS. Thus, a customer can currently access UPS services by way of the Internet interface or XOLT.

Many technologies used in the structure of the commerce server 10, such as programming languages, are available in various versions or level. Usually, having common levels amongst interacting elements is preferred because it usually improves operation. For example, uniformity of the level of XML (e.g., XML Plus) for the XML tool set and the commerce server 20 is preferred to ensure better intra-system communications and operations. Uniform XML levels with the communication system 10 may, for instance, help avoid scenarios wherein customers 16 have to select between implementing and using local access (i.e., via XOLT) having one level of XML and Internet-based access having another XML level. Also, customers will likely prefer the local XML-based access to services and data because they may be less comfortable having vital operations (i.e., getting products to their customers) performed on an Internet connection, which fails from time to time. In a preferred embodiment of the present invention, the XML-based access is the primary access point for the customer and vendor software 18 to the programs and data of the commerce server 20 and the Internet-connection is a backup to the XML tool. In one embodiment, it is especially preferred that high-level processes be handled locally to ensure more reliable service and higher customer confidence.

In designing the commerce system 10, the designer may consider how close the commerce server 20 and tools (e.g., XOLT) for communicating in the corresponding markup language (e.g., XML) should be to each other in type and/or in proximity. For example, the designer may identify particular value in having the commerce server 20 and the communication tool (e.g., XOLT) being the same or substantially or practically the same. The designer of the system 10 may also consider how the system should document and manage any extensions and/or differences between the commerce server and the communication tool.

The designer of the commerce system 10 may also consider how component-specific work will be managed. For example, changes to or extensions to a program or component that existed (e.g., on the remote web services 66) before the creation of the commerce server 20 according to the present invention for use in the commerce server may be made with consideration given to the smoothness by which that program would operate with the existing web services version of the same program.

Although the commerce system 10 according to the present invention has primarily been described above as including a single server 20 embedded within existing hardware 12 on the customer site 14, some embodiments of the commerce system include more than one commerce server 20 and the one or more servers may be positioned in additional hardware (not shown) positioned at the customer site without departing from the scope of the present invention. For example, the designer of the system 10 may consider the scalability of having more than one server for a particular or all customer or vendor needs. For instance, the commerce system 10 can include separate commerce servers 20, each serving different functions with respect to customer needs and requests by way of the vendor server 18.

The designer of the commerce system 10 may also consider system architectural issues such as whether hosting features should be provided by the customer or a third-party. The designer may also consider preferred methods of intra-system 10 communications, such as how the commerce system 10 will communicate with the remote web services 66. For example, as will be understood by those skilled in the art, the designer may determine that communications to the remote web services 66 is best accomplished through proxy or through route-around. In one embodiment of the present invention, access to remote web services 66 through proxy is preferred for security and reasons relating to an ability to log features.

The commerce server 20 may be created using any of various software creating or developing tools. One exemplary software development tool is InstallShield, available from Macrovision Corporation, which is used for creating installers and software packages. Various software solutions may be used by designers of the commerce system 10 for updating the software of the commerce system. One exemplary software updating solution is the RTPatch, available from Pocket Soft Inc., of Houston, Tex.

An additional program feature of the commerce system 10 and commerce server 20 according to the present invention is marketing analytics. Marketing analytics are methods and systems for identifying and communicating potential synergies between the needs of the customer and the resources of the delivery services company. Marketing analytics may set local (i.e., customer-specific) performance-based triggers for communicating incentives or support-targeted campaigns for increased volume of shipments by the customer, overall cost savings to the customer, and revenue enhancement of the delivery company. Execution can be facilitated by changing local rates or simply triggering e-mail or graphical user interface notification to appropriate, identified, contacts.

The marketing analytics program can consider many factors in determining what deals or special services to offer a particular customer, such as densities of delivery lanes. For example, if a customer requests to ship ten packages from city A to city B on a certain day, the marketing analytics program may determine that the delivery company has unused capacity in the A-to-B channel or lane (e.g., on its transport, such as a truck) on that day and advise the customer that they can get a discount, such as a 5% discount, if they ship additional packages on that same route on the same day. Such arrangement can be a win-win situation for the customer and the delivery company because the delivery services company improves the efficiency with which it uses its resources and the customer ships packages at a discounted rate.

Another aspect of the commerce system 10 and commerce server 20 according to the present invention is support of supply chain logistics. A supply chain or supply network is a coordinated system (including, e.g., organizations, people, activities, information, and resources) involved in moving a product from a supplier (i.e., the customer of the vendor and perhaps also of the delivery services company) to a purchaser of the supplier's product. The services of delivery services companies have traditionally been positioned at the end of the customer's role in the supply chain, namely where the delivery services company receives an order for delivery and picks up the package. Because of the flexibility, up-to-date information, and easy accessibility of the commerce server 20 (e.g., through the customer's enterprise resource planning (ERP) software), the customer can use the commerce server at all stages of its logistics or supply chain.

The commerce server 20 may be especially helpful to the customer at many stages of the delivery process when it is integrated into the operations-management system (e.g., ERP system) that the customer already uses for managing orders and their warehouse operations, including inventory control. For example, the customer may access the commerce server 20 via their ERP system in executive planning stages wherein the logistics network is being created or restructured. For instance, managers of the supply network of the customer may desire to adjust configuration of their supply chain to make it more efficient considering information received from the commerce server 20 such as deals from the marketing analytics component of the server, desirable rates from the account-based rating web service, and/or time-in-transit quotes from the time-in-transit or quantum view web services. It is contemplated that the commerce server 20 could be useful in the product-delivery process of the customer as early as a manufacturing stage or even a product-design stage.

The programs (e.g., web services 42, 66) of the commerce system 10 and server 20 are designed to be very granular or flexible for supporting supply chain logistics. That is, when the programs can be easily pushed or made available to the customer at various stages of the supply chain, the programs are more likely to be used by and especially useful to the customer beyond traditional core uses of the programs. For example, regarding rating, if a customer (e.g., customer representative 16) is entering information regarding a package to be shipped and wants to use the rating service outside of shipping, such as to check or compare prices under various contemplated scenarios, they are able to do so easily via the local or remote web services 42, 66. Generally, the commerce system 10 can be used to facilitate customer planning and implementation of processes for managing goods, such as inventory location and location transfer, and/or functions, such as allocation of workforce and paths by which employees move, with out without goods or equipment.

Also for supporting supply chain logistics, the programs of the commerce server 20 can be integrated into the customer's order-taking process and allow customers to provide their customers with information regarding potential and actual shipments before and throughout the shipment process. For example, if a purchaser of the customer calls the customer asking for a price quote for shipping particular merchandise from city A to city B, the customer will be able to procure that information through the commerce server 20, by way of the vendor server 18 maintained on the vendor, and particularly from the rating web service of the commerce server, and provide the information to the purchaser.

One particular type of supply chain logistics is called wave processing. Wave processing is a method of processing large numbers of orders (such as 100,000 in a day) by breaking the in-warehouse operations into waves. Waves can be organized, for example, by inventory location, walk paths for people and in-warehouse vehicles, and the like, so the actions within the warehouse are as efficient as possible. Larger organizations, which are those more likely to implement wave processing, may continuously match their large order list against inventor locations and dispatch the appropriate pickers or personnel picking the items from stored shelf locations, prepare the packers, such as by notifying the packers of the existence and perhaps qualities (e.g., size, weight) of coming items, and prepare any other work needed to get the item from the shelf, down the rollers, and to the ship point and out the warehouse door as efficiently as possible. Wave processing can broadly include many functions, such as inventory control, managing cost accounting, and charging the customer.

The commerce server 20 can facilitate steps of the wave processing by, beyond just taking an order, participating in, facilitating, and/or initiating logistical/planning considerations. For example, the commerce server 20 can inform the customer that they may save money by shipping the item from their second warehouse instead of shipping it from their first warehouse as they were initially planning to do. As another example, the commerce server 20 can advise the customer that they can save money and/or time if they combine certain orders together. So the commerce server 20 can be used in the realm of business processes implementation whereby the customers' interaction with the services, including information services, of the delivery services company goes beyond the traditional end-of-the-rollers, out-the-door, position of the warehouse. In this way, the web services interface of the commerce server 20 becomes a generic call mechanism that can be implemented in various stages of the supply chain upstream from pick-up.

As referred to above, the ability of the commerce server 20 to support supply chain logistics also allows purchasers of the customer's products to make informed decisions, such as those regarding the timing and cost of shipments of the products they buy. The commerce server 20 may be configured to proactively or automatically seek, procure, and provide information needed to facilitate efforts of the customer or their customer, the purchasers. For example, as a purchaser enters information into the customer's purchasing system, software in the vendor server 18 may realize that it (the vendor server) needs to reach to the commerce server 20 for certain actions or pieces of information, such as address validation or getting rates. The commerce server 20 then performs the action or procures and provides the information quickly.

Another feature of the commerce server 20 according to the present invention is called "componentizing", or making data objects more mobile so they can more easily be moved between remote web services 66 and the commerce server. Such componentizing is facilitated though uniform design and/or use of flexible computer systems such as the application system/400 described above.

The commerce server 20 may be programmed to include rules of usage for ensuring that it is used as desired by the delivery services company. For example, to avoid server latency, operation benchmarks can be set such as a maximum amount of transactions in a certain timeframe, such as weekly or daily. The rules of usage may also limit the ability of a vendor or customer to transfer the commerce server 20 authenticated for them or use it to serve more than the authorized customer(s).

The server 20 may also be configured so customers or others cannot repeatedly tap the system in search of special deals, such as guaranteed rates, that the system 10 is designed to offer (e.g., as part of marketing analytics) only under particular conditions. The server 20 may also be configured so that system 10 performance standards are tracked. For example, the system 10 can monitor whether the graphical user interface 24 displays deployed data changes or information associated with marketing analytics within a defined time from the update. Such monitoring is sometimes referred to as compliance or quality monitoring.

In one embodiment of the present invention, the commerce server 20 is installed or configured into or along-side the vendor server 18 through a series of required steps. As an initial step, operating agreements, such as operational and/or service level agreements (OLA/SLA) need to be established between the delivery services company and the installer, which is usually a vendor of computer solutions. Next, the product, including software and accompanying documentation, is provided to the vendor or installer. The product may include web services interface specifications, which the vendor may review, for installing the server contained in the product documentation. The web services interface specifications may outline field and mapping definitions.

The installation process and later development and operation processes may include a key or pass-code process using a developer key and an access key. The commerce system 10 may also be configured to use passwords, or other similar security or access credentials known to those skilled in the art, in lieu of or along with keys. The developer key may be provided with the software and corresponding documentation and required for unpacking the commerce server and installing the commerce server 20 in the vendor software 18. Requiring the developer key ensures that the software is not used or tinkered with by anyone except the selected participants provided with the developer key. Registrations occur through the commerce server 20 (e.g., through the installation program 38), which verifies that the proper developer key is being used.

After the commerce server 20 verifies that the proper developer key has been presented, the vendor can begin developing to and integrating with the commerce server. For example, the vendor ensures proper connection between the interfaces of their server 18 and the commerce server 20. Proper connection may be ensured though tests, for example. Installation tests may be built into the commerce server 20 and also, for later stages of the installation process, within the remote devices 26 that the vendor server 18 will eventually connect to via the commerce server. For the initial, on-site 14, testing, the vendor server 18 connected to the commerce server 20 can request data from the commerce server and, if the commerce server is properly located, configured, and connected and the servers are communicating back and forth appropriately, will receive test scripts or narratives (so-called canned data). The test data may be data regarding a hypothetical package shipment from the commerce server. If the vendor installs the commerce server 20 improperly, the package including the commerce server will not allow the vendor to proceed in the installation process.

After verifying proper installation through the internal stage by the test cases within the commerce server 20, the installation proceeds to the next stage in which the vendor determines whether the installed package can properly communicate with the remote devices 26 such as the remote web services 66. The remote devices 26 may include a license and access tool 74 (referenced in FIG. 1) that communicates with the commerce server 20 during the remote validation stage. The remote devices 26 may include test data as well. For example, the message-management system 64 can include a test message-management compartment including remote canned data for use only in installation testing. The test message-management compartment may be connected to the package level detail or other program updating data within the message-management system 64.

In addition to the commerce system 10 ensuring that the installed commerce server 20 is properly installed and mapped to the vendor server 18 and remote devices 26, the vendor may also be required to demonstrate certain competencies. For example, during installation testing, the vendor may be required to access data within the message-management compartment before an update of data in the message-management compartment and then again after the update to demonstrate their ability to procure original and updated data as needed (e.g., in a timely and accurate manner).

After the commerce system 10 including the commerce server 20 verifies that the vendor has properly installed the commerce server, the vendor is issued an access key, which may be used though the particular installation to access the services and information of the delivery services company from and through the commerce server and which is linked to the particular, already assigned, developer key. The access key allows the system 10 including the commerce server 20 to start running. Thereafter, when the remote devices 26 receive communications from the commerce server 20, such as inquiries for updated data, the remote devices will recognize the authorized user by the access key that may or must be presented with the initiation of each communication between the local and remote applications.

After the vendor installation has been fully verified, the installation must then be commissioned. Commissioning includes assignment of a message-management compartment in the message-management system 64 to the particular commerce server 20 installation so the particular installation can receive updates specific to that installation (i.e., specific to the particular customer for which the vendor is maintaining the customer management software). Commissioning can be performed through a commissioning program or element 76 (referenced in FIG. 1) in the remote devices 26. After a message-management compartment is assigned during commissioning, the particular commerce system 10 is ready for operation.

The commerce system 10 according to the present invention has numerous benefits. According to at least one embodiment of the system 10 and processes associated with using it, the vendor implementing the system in combination with the delivery services company will still be responsible for maintaining the customer experience including the customized user interface. In this way, the vendor can focus on their specialty (i.e., maintaining the customer interface) instead of spending a lot of time updating the delivery services. Also, the delivery services company can focus energy on their expertises: developing new services; implementing the new services and supporting data (e.g., rates) through the commerce server 20; and providing the services instead of needing to do those things in addition to maintaining an on-site customer interface. Further, costs for certifying the vendor shipping systems regularly (e.g., annually), and implementing new services and updates are lower for the delivery company when they do not need to maintain the user interface and the costs of the vendor are lower because they do not have to attend to processes of updating and implementing data.

Moreover, there may be frequent changes to data supporting services of the commerce company, such as rates and business rules (e.g., every week or even every day or during a day) and it is very expensive for vendors to deal with them all. It is much better for the delivery company to handle the changes in their remote device 26 and push them down to the commerce server (or allow pull of the data to the commerce server from the remote server). Some vendor servers 18 do not accommodate certain services of the commerce company under existing commerce systems due to the burden of implementation of those services and updating of data supporting those services. For example, many vendor servers 18 do not accommodate international shipping services because of the large amount of documentation/forms and requirements of the delivery services company. The commerce system 10 of the present invention allows vendors to implement new services and business rules and update data associated with those services and rules in a less burdensome manner. The system 10 may serve the common needs of the customer, such as regular domestic shipments and less frequent needs, using certain programs of the system and serve less frequent needs, such as international and hazardous material shipments by other programs of the commerce company in the commerce server 20 designed for the respective purpose (e.g., UPS's WorldShip and HazMat shipping products).

It is envisioned that after the commerce system 10 has been installed, every product of the delivery services company (e.g., all of the same products that a customer can access through the web site of the delivery services company) could be made available to the customer by way of the commerce server 20.

The commerce system 10 including the commerce server 20 reduces the burden of implementing new software and rates for all parties (e.g., delivery company and vendor). The system 10 also removes or greatly limits any subjectivity involved with vendors' interpretation and proper implementation. For example, as described in the Background of the Disclosure, in the past, vendors would sometime implement updates or new services and rates at a convenient time for them or never, even if that greatly postpones introduction of the updates or results in an incomplete product offering. Such delays or omissions may occur, for example, due to vendor's cost-benefit-analysis and/or their interpretation of the customer's needs, both of which are sometimes incorrectly assessed.

Another benefit of the commerce system 10 including the commerce server 20 according to the presentation invention is that the customer is more insulated from changes involved with introductions of new products or supporting data, such as rates, because the products and supporting data can be implemented behind the scenes without the customer noticing the implementation being done. Some traditional commerce systems implement new products by providing new hardware at a time, space, and perhaps work burden to the customer during installation and at least a space burden to the customer after installation.

The commerce system 10 including the commerce server 20 can also support specialized and contract services of the delivery services company, including those not widely available and will be able to support services that are not yet available in current vendor solutions. Such solutions include, for UPS, for example, WorldEase, TradeDirect, WorldShare, Hundred Weight comparison, Basic, Signature Release, Early AM territory updates, International, HazMat, and WorldEase. Other solutions that can be implemented though the system 10 include services yet to be launched to the vendor community such as, for UPS, account-based rates (ABR) and Trade direct.

An additional benefit of the commerce system 10 is that it provides customers access to the newest products of the delivery services company and supporting information (e.g., rates) in a timely and accurate manner. Accurate information benefits the delivery company too through new service penetration because a customer is more likely to use new services they are aware of and can access more easily. Also, customers may use services more when they have confidence that the rates are up-to-date and accurate and, perhaps, knowing that they will be getting appropriate performance-based discounts.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

That which is claimed:

1. A commerce system for serving a customer of delivery services of a delivery services company using dynamically updated data related to the delivery services, the system comprising:

platform services positioned at a location of the customer;
   an operations-management server managed by a vendor positioned at the customer location and operatively connected to the platform services, the operations-management server including:
      a customer interface through which the customer accesses the operations-management server; and
      an intra-system interface;
   a local commerce server managed by said delivery services company positioned at the customer location and operatively connected to the operations-management server maintained by the vendor and the platform services, the local commerce server including:
      local commerce programs configured for providing services of the delivery services company to the customer; and
      a commerce-server interface for connecting the local commerce server to the intra-system interface of the operations-management server;
   a database operatively associated with the local commerce server for storing locally-stored commerce data used by the local commerce programs of the local commerce server to provide said services to the customer during operation of the commerce system; and
   a remote computer system maintained by the delivery services company positioned remote to the customer location and external to the local commerce server, the remote computer system operatively connected to the local commerce server maintained by the delivery services company by way of an external network to allow transfer of data between the remote computer system and the local commerce server, the remote computer system comprising:
      a message-management system including a plurality of message-management compartments, at least one of the plurality of message-management compartments being configured to store (a) remotely-stored commerce data in a memory external to the database and (b) update data specific for said customer for updating the locally-stored commerce data comprising package delivery service data corresponding to said customer, in the local commerce server, to reflect the remotely-stored commerce data in response to receipt of a request from the local commerce server for updated data; and
      remote commerce programs including programs corresponding to each of said local commerce programs;
   wherein (a) the operations-management server and the local commerce server run together and interactively on the platform services during operation of the commerce system, (b) the update data is transmitted to the local commerce server in response to the local commerce server sending a query to at least one of the message-management compartments, the query requests whether update information exists for an account associated with the customer, and (c) after the update data is received by the local commerce server, the locally-stored commerce data is updated with the update data specific for said customer thereby allowing access to information in the remotely-stored commerce data without requiring communication with the remote computer system maintained by the delivery services company.

2. A commerce system as recited in claim 1 wherein the local commerce server is configured to store access credentials and the message-management system is configured to verify that the local commerce server provides the access credentials before the at least one message-management compartment releases data updates to the local commerce server.

3. A commerce system as recited in claim 2 wherein the remote computer system is programmed such that said at least one message-management compartment is dedicated to holding update data specific to said customer.

4. A commerce system as recited in claim 1 wherein the database is positioned within the local commerce server and/or the platform services.

5. A commerce system as recited in claim 1 wherein said delivery services provided by the delivery services company to the customer include delivering packages.

6. A commerce system as recited in claim 1 wherein said local commerce server is configured to provide said services to the customer using the local commerce programs and, under certain circumstances, using the remote commerce programs.

7. A commerce system as recited in claim 1 wherein the local commerce server and the operations-management server are located in the same computer hardware.

8. A commerce system as recited in claim 1 further including a web service positioned at the customer location and connected to the intra-system interface of the operations-management server, the commerce-server interface of the commerce server, and the external network, wherein the operations-management server may selectively communicate with the local commerce server and said external network by way of the web service during operation of the commerce system.

9. A commerce system as recited in claim 8 wherein said web service includes an application program interface.

10. A commerce system as recited in claim 1 wherein said locally-stored commerce data includes rates for services provided by the delivery services company to the customer and said update data further includes current rates due to customer performance.

11. A commerce system as recited in claim 1 wherein said local commerce server is natively embedded with the operations-management server maintained.

12. A commerce system for serving a plurality of customers using dynamically updated data, the system comprising:
   a plurality of local computer systems, each local computer system positioned at a location of a respective customer of the plurality of customers and including:
      platform services;
      an operations-management server operatively connected to the platform services and including an intra-system interface;
      a local commerce server operatively connected to the operations-management server and the platform services, the local commerce server including:
         local commerce programs configured for providing services of a commerce entity to the customer using said locally-stored commerce data; and
         a commerce-server interface for connecting the local commerce server to the intra-system interface of the operations-management server; and
         a database operatively associated with the local commerce server storing locally-stored commerce data for use in serving the client during operation of the commerce system;
      wherein the operations-management server and the local commerce server run together and interactively on the platform services during operation of the local computer system; and
   a remote computer system positioned external to each local computer system of said plurality of local computer systems and operatively connected to the local commerce server of each local computer system to allow transfer of data between the remote computer system and each local commerce server, the remote computer system comprising:
      a message-management system including a plurality of message-management compartments configured to store (a) remotely-stored commerce data in a memory external to the database and (b) update data specific for said plurality of customers for updating said locally-stored commerce data comprising package delivery service data corresponding to said customer, stored on the commerce servers of the plurality of local computer systems, to reflect the remotely-stored commerce data in response to receipt of a request from the local commerce server for updated data; and
      remote commerce programs including programs corresponding to each of the local commerce programs of the plurality of local computer systems;
   wherein (a) the update data is transmitted to the local commerce server in response to the local commerce server sending a query to at least one of the message-management compartments, the query requests whether update information exists for an account associated with the customer and (b) after the update data is received by the local commerce server, the locally-stored commerce data is updated with the update data specific for said plurality of customers thereby allowing access to information in the remotely-stored commerce data without requiring communication with the remote computer system maintained by the delivery services company.

13. A commerce system as recited in claim 12 wherein the plurality of message-management compartments includes particular message-management compartments dedicated to holding update data for use in updating respective local commerce servers of the plurality of local commerce servers.

14. A commerce system as recited in claim 13 wherein at least one of the particular message-management compartments holds data specific to the respective local commerce server to which the at least one particular message-management compartment corresponds.

15. A commerce system as recited in claim 12 wherein the plurality of message-management compartments includes particular message-management compartments, each being accessible only by at least one corresponding local commerce server of the plurality of local commerce servers.

16. A commerce system as recited in claim 12 wherein the local commerce server is natively embedded with the operations-management server.

17. A method for dynamically updating data available to a customer at a location of the customer, the method comprising:
providing platform services at the customer location
providing an operations-management server at the customer location operatively connected to the platform services;
providing a local commerce server at the customer location operatively connected to the operations-management server and the platform services, the local commerce server including local commerce programs and locally-stored commerce data for use by the local commerce programs to provide services of a commerce entity to the customer;
providing a remote computer system positioned external to the customer location and operatively connected to the local commerce server by an external network to allow transfer of data between the remote computer system and the local commerce server, the remote computer system including:
a message-management system having a plurality of message-management compartments, each message-management compartment of the plurality of message-management compartments being configured to store (a) remotely-stored commerce data in a memory external to the locally-stored commerce data and (b) update data specific for said customer for updating the locally-stored commerce data comprising package delivery service data corresponding to said customer, stored on the local commerce server, to reflect the remotely-stored commerce data in response to receipt of a request from the local commerce server for updated data; and
remote commerce programs corresponding to each of said local commerce programs;
updating the locally-stored commerce data of the local commerce server by routing said update data from a particular message-management compartment of the plurality of message-management compartments to the local commerce server, in response to the local commerce server sending a query to each message-management compartment requesting whether update information exists for corresponding accounts of each of the customers, thereby allowing access to information in the remotely-stored commerce data without requiring communication with the remote computer system; and
serving the customer, without requiring communication with the remote computer system, including running the operations-management server and commerce server together and interactively on the platform services and using at least one of the local commerce programs and said locally-stored commerce data updated by the update data specific for said customer received from the remote computer system in the updating step.

18. A method as set forth in claim 17 wherein the step of serving the customer further includes serving the customer by way of the operations-management server using at least one of the remote commerce programs.

19. A method as set forth in claim 17 further including the local commerce server requesting the data updates from the remote computer system wherein said updating step is performed in response to said request.

20. A method as set forth in claim 17 wherein the updating step is performed automatically on a regular basis.

21. A method as set forth in claim 17 wherein the updating step is initiated by the remote computer system after new update data is available in the particular message-management compartment.

22. A method as recited in claim 17 wherein the step of providing a local commerce server and the step of providing an operations-management server include positioning the local commerce server and the operations-management server in the same computer hardware.

23. A method as recited in claim 17 wherein:
the customer operates a logistics process to manage goods and/or functions; and
said serving step includes providing information to the customer for use in various stages of said logistics process using the locally-stored commerce data updated with the update data in the updating step.

24. A method as recited in claim 17 further including providing update data to the message-management compartments, wherein update data added to said particular message-management compartment of the plurality of message-management compartments is specific to the customer.

25. A method as recited in claim 17, further including a commerce entity maintaining the local commerce server and the remote computer system and another entity maintaining the operations-management server.

26. A method as recited in claim 25 wherein:
said commerce entity maintaining the local commerce server and the remote computer system is a delivery services company; and
said another entity maintaining the operations-management server is a software vendor, and said locally-stored commerce data, said update data, and services provided to the customer during the serving step relate to package-delivery services.

27. A method as recited in claim 25 wherein:
said update data routed from the message-management compartment to the local commerce server during the updating step includes at least one type of package-delivery-services-related data selected from a group of package-delivery-services-related data consisting of pricing data regarding a package delivery and transit data regarding a package delivery; and
the step of serving the customer includes providing pricing-related services and transit-related services to the customer.

28. A method as recited in claim 17 wherein the step of providing the local commerce server includes natively embedding the local commerce server with the operations-management server.

29. A method for dynamically updating data available to a plurality of customers at respective locations of the customers, the method comprising:
providing a plurality of local computer systems, each local computer system positioned at a location of a respective customer of the plurality of customers and including platform services, an operations-management server operatively connected to the platform services, and a local commerce server operatively connected to the operations-management server and the platform services, the local commerce server including local commerce programs and locally-stored commerce data for use by the local commerce programs to provide services of a commerce entity to the customer;
providing a remote computer system positioned external to the customer locations and operatively connected to the local commerce server of each local computer system by at least one external network to allow transfer of data between the remote computer system and the local commerce servers, the remote computer system including:
a message-management system having a plurality of message-management compartments, each message-management compartment configured to store (a) remotely-stored commerce data in a memory external to the locally-stored commerce data and (b) update data specific for said plurality of customers for updating the locally-stored commerce data comprising package delivery service data corresponding to said customer, stored on a corresponding commerce server of the commerce servers of the plurality of computer systems, to reflect the remotely-stored commerce data in response to receipt of a request from the local commerce server for updated data; and
remote commerce programs corresponding to each of said local commerce programs;
updating the locally-stored commerce data of the local commerce servers by routing said update data from each message-management compartment to the corresponding local commerce server, in response to the local commerce server sending a query to each message-management compartment requesting whether update information exists for corresponding accounts of each of the customers, thereby allowing access to information in the remotely-stored commerce data without requiring communication with the remote computer system; and
serving each customer, without requiring communication with the remote computer system, including, for each respective local computer system, running the operations-management server and the commerce server together and interactively on the platform services and using at least one of the local commerce programs and said locally-stored commerce data updated by the update data specific for said plurality of customers received from the corresponding message-management compartment of the remote computer system in the updating step.

30. A commerce system as recited in claim 1 wherein the update data is transmitted to the local commerce server in response to authenticating an access key associated with the account of the customer.

31. A commerce system as recited in claim 12 wherein the update data is transmitted to the local commerce server in response to authenticating an access key associated with the account of the customer.

32. A method as set forth in claim 17 wherein the routing of the update data to the local commerce server is in response to authenticating respective access keys associated with the corresponding accounts of the customers.

33. A method as set forth in claim 29 wherein the routing of the update data to the local commerce server is in response to authenticating respective access keys associated with the corresponding accounts of the customers.

* * * * *